US012126943B1

(12) United States Patent
Bacim de Araujo e Silva et al.

(10) Patent No.: US 12,126,943 B1
(45) Date of Patent: Oct. 22, 2024

(54) SPATIAL LIGHT SYSTEM

(71) Applicant: Apple Inc., Cupertino, CA (US)

(72) Inventors: Felipe Bacim de Araujo e Silva, San Jose, CA (US); Stuart J. Wood, Cupertino, CA (US); Noah D. Bedard, Cupertino, CA (US); Bosheng Zhang, Cupertino, CA (US); Dana F. Segler, Jr., Cupertino, CA (US); Blake M. Coughenour, Sunnyvale, CA (US); Rong Liu, Mountain View, CA (US); Yung-Yu Hsu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/665,331

(22) Filed: Feb. 4, 2022

Related U.S. Application Data

(60) Provisional application No. 63/146,506, filed on Feb. 5, 2021.

(51) Int. Cl.
*H04N 9/31* (2006.01)
*G01B 11/25* (2006.01)
*G03B 21/20* (2006.01)

(52) U.S. Cl.
CPC ........... *H04N 9/3138* (2013.01); *G01B 11/25* (2013.01); *G03B 21/2013* (2013.01); *G03B 21/2033* (2013.01); *G03B 21/208* (2013.01); *H04N 9/3147* (2013.01); *H04N 9/3164* (2013.01); *H04N 9/3194* (2013.01)

(58) Field of Classification Search
CPC ...... G03B 21/00–64; H04N 9/31–3197; G01B 11/25
See application file for complete search history.

(56) References Cited

U.S. PATENT DOCUMENTS

| 7,300,179 | B1 | 11/2007 | LaDuke et al. |
| 8,317,331 | B2 | 11/2012 | Li |
| 8,736,675 | B1 | 5/2014 | Holzbach |
| 8,879,782 | B2 | 11/2014 | Garlington et al. |
| 9,134,593 | B1 * | 9/2015 | Worley, III .......... H04N 9/3194 |
| 9,239,627 | B2 | 1/2016 | Kryze et al. |

(Continued)

OTHER PUBLICATIONS

U.S. Appl. No. 63/058,240, filed Feb. 5, 2021, Felipe Bacim de Araujo e Silva, et al.

(Continued)

*Primary Examiner* — Bao-Luan Q Le
*Assistant Examiner* — Christopher A Lamb, II
(74) *Attorney, Agent, or Firm* — Robert C. Kowert; Kowert, Hood, Munyon, Rankin & Goetzel, P.C.

(57) ABSTRACT

A spatial light system that may, for example, be used to project image content onto surfaces of a room. The system may include two or more projection units for emitting light onto surfaces within a room. The system may include a controller and two or more projection units, each module including an LED array, an array of light pipes, and a condenser lens. Two or more projection units may be connected to a flexible strip that provides power and data (e.g., serial data) to the projection units. Two or more flex strips may be connected together. The flex strips provide a serially-connected, flexible modular architecture for spatial light systems that allow the projection units to be conformed to a variety of configurations and shapes.

20 Claims, 22 Drawing Sheets

(56) References Cited

U.S. PATENT DOCUMENTS

| | | |
|---|---|---|
| 9,261,762 B2 | 2/2016 | Kim |
| 10,004,984 B2 | 6/2018 | Voris et al. |
| 10,297,082 B2 | 5/2019 | Wilson et al. |
| 10,388,641 B2 | 8/2019 | Martin |
| 10,921,878 B2 | 2/2021 | Noris et al. |
| 2007/0092189 A1 | 4/2007 | Morejon |
| 2009/0051831 A1* | 2/2009 | Bierhuizen .......... G03B 21/208 349/5 |
| 2010/0309390 A1* | 12/2010 | Plut .................... H04N 9/3147 348/744 |
| 2013/0342813 A1 | 12/2013 | Wang |
| 2014/0160442 A1* | 6/2014 | Lee .................... H04N 9/3161 353/38 |
| 2014/0185285 A1* | 7/2014 | Jorgensen .......... G02B 19/0066 362/232 |
| 2016/0109102 A1 | 4/2016 | Kim |
| 2016/0150201 A1 | 5/2016 | Kilche |
| 2018/0129167 A1 | 5/2018 | Maimone |
| 2019/0212642 A1 | 7/2019 | McMillan |
| 2019/0369298 A1 | 12/2019 | Ja |
| 2020/0081492 A1 | 3/2020 | Wang |
| 2020/0088358 A1* | 3/2020 | Minor .................... F21K 9/60 |
| 2020/0236759 A1 | 7/2020 | Jurik |

OTHER PUBLICATIONS

U.S. Appl. No. 17/240,447, filed Apr. 26, 2021, Michael D. Simmonds, et al.

U.S. Appl. No. 17/935,010, filed Sep. 23, 2022, Felipe Bacim de Araujo e Silva, et al.

* cited by examiner

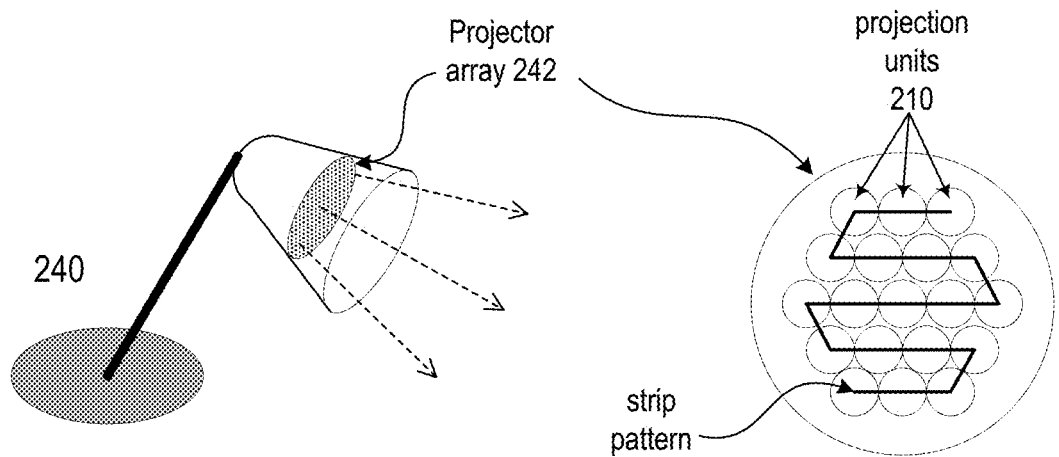
FIG. 2A
FIG. 2B
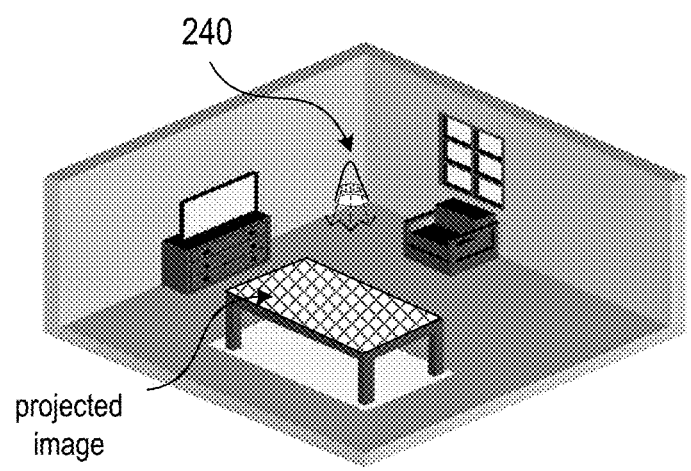
FIG. 2C

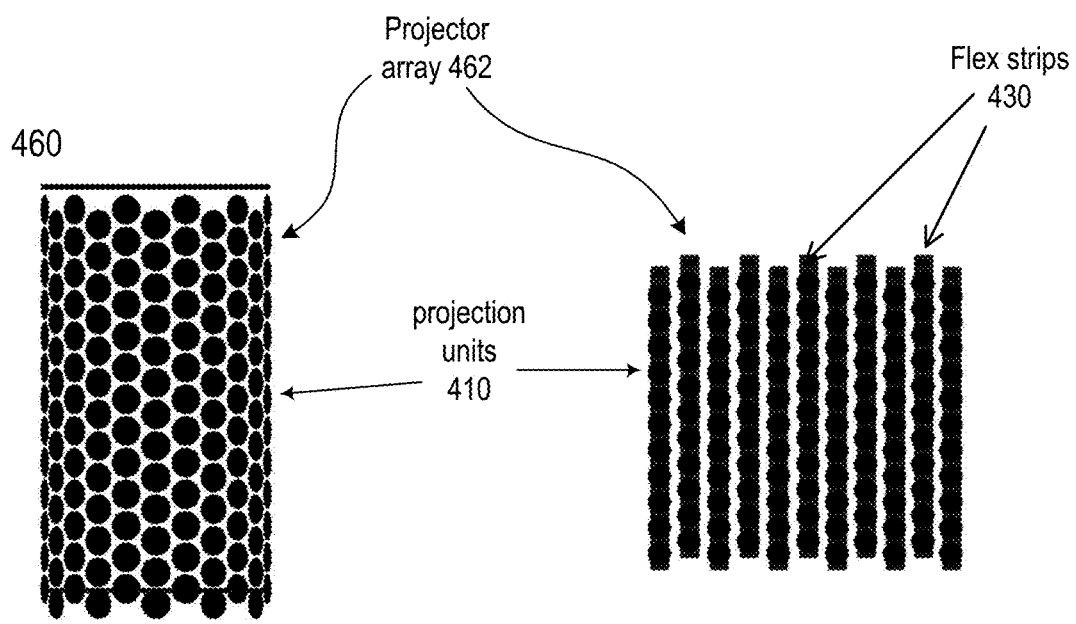
FIG. 4A
FIG. 4B
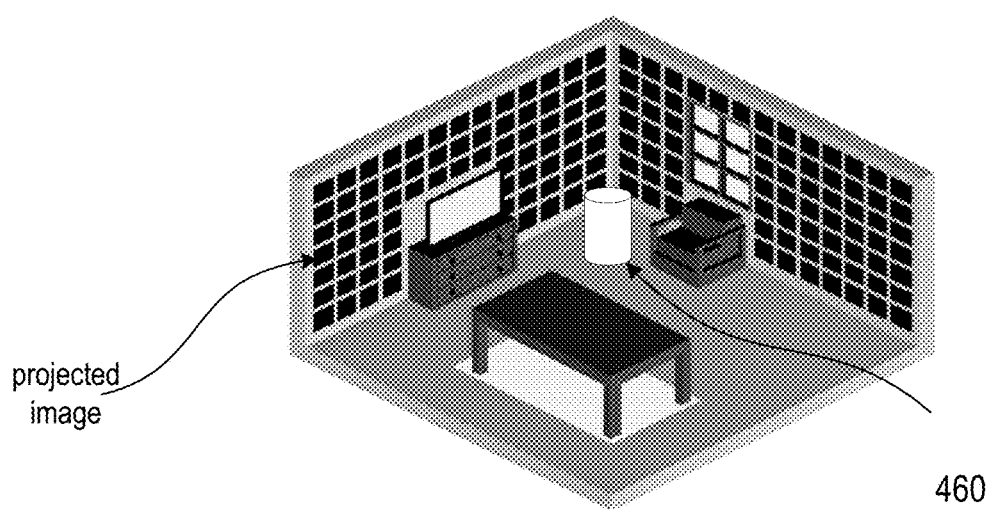
FIG. 4C

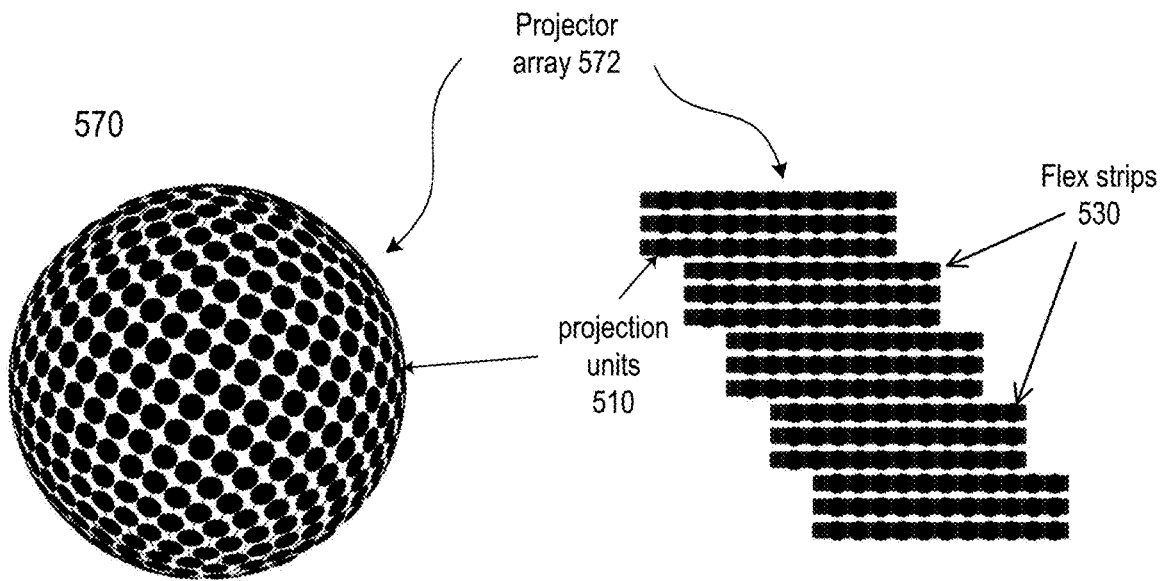
FIG. 5A
FIG. 5B
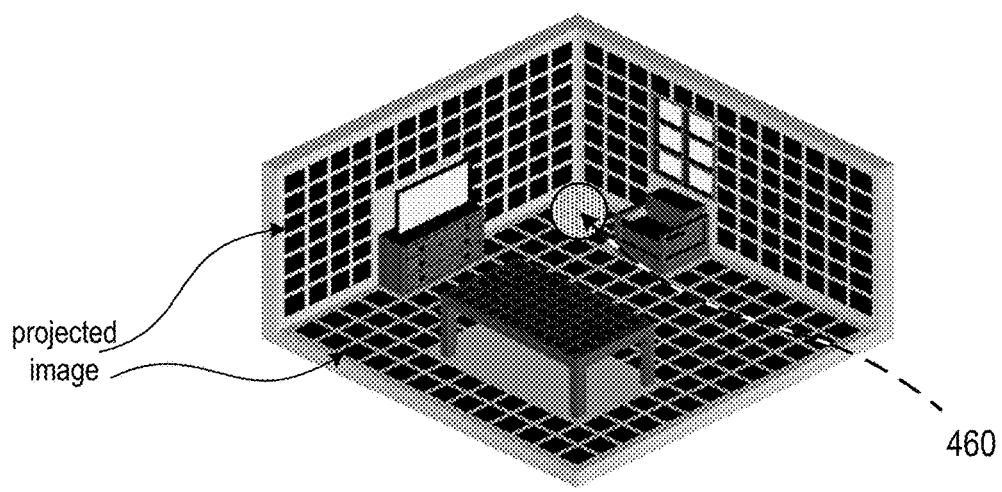
FIG. 5C (A)

(B)

(C)

*Light up a room*

*Even light across room*
*Mask things like TV, windows and your eyes*

SPATIAL LIGHT SYSTEM

This application claims benefit of priority to U.S. Provisional Application Ser. No. 63/146,506, entitled "Spatial Light System," filed Feb. 5, 2021, and which is hereby incorporated herein by reference in its entirety.

BACKGROUND

Light emitting diodes (LEDs) are used in a variety of applications. LEDs can be produced that emit light in a variety of colors and wavelengths, including light in the visible and infrared (IR) portions of the spectrum.

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) or augmented reality (AR) systems combine computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for emitting light including light representing augmented reality (AR) content into environments such as rooms are described. Embodiments of a spatial light system are described that may, for example, be used to project AR content onto one or more surfaces of a room. In some embodiments, a spatial light system may include two or more light-emitting diode (LED) projection units for emitting light representing AR content onto surfaces within a room, onto object(s) within a room, or onto surfaces in a portion of a room. In some embodiments, a spatial light system may also be configured to emit diffuse light to illuminate a room, object(s) within a room, or a portion of a room when not emitting light representing AR content.

In some embodiments, a spatial light system may include a controller comprising one or more processors and one or more projection units. Embodiments of projection units are described that each include an active matrix LED array, an array of light pipes, and condensing optics (referred to as a condenser lens). The LED array may, for example, be an array of individually addressable LEDs. The LEDs may include white light-emitting LEDs and color-emitting LEDs. While embodiments are generally described in which projection units include light pipe arrays, other combination of light collection or light shaping optical elements may be used.

In some embodiments, two or more projection units may be connected to a flexible strip (referred to as a flex strip) that provides power and data (e.g., serial data) to the projection units. Two or more flex strips may be connected together. The flex strips of projection units provide a serially-connected, flexible modular architecture for spatial light systems that allow the projection units to be conformed to a variety of configurations and shapes. However, in some embodiments, the projection units may be mounted to a fixed surface that includes connections for power and/or data for the modules. In some embodiments, one or more other modules such as sensor modules (depth sensors, light sensors, motion sensors, cameras, etc.) may also be connected to the flex strips in addition to the projection units, for example to provide depth information for surfaces and object in the room, or to detect presence and motion of persons in the room.

In some embodiments, components of a spatial light system including but not limited to the projection units may be packaged or contained within an enclosure or "bulb-like" structure of a transparent or semi-transparent material (e.g., glass or plastic). In some embodiments, a spatial light system may be connected to electrical power, for example via a conventional light socket or via a conventional power plug. Embodiments of a spatial light systems as described herein, may, for example, be hung from a ceiling, or mounted on floor or table stands.

In some embodiments, a spatial light system may include a controller or control system that may, for example, provide power and video signals to the LED projection units. In some embodiments, a spatial light system may also include wireless technology that enables wireless communications between the spatial light system and other devices, such as an AR/VR system (e.g., an AR/VR headset or glasses), a mobile multipurpose device such as a smartphone, pad or tablet device, a smart TV, or a computer system. In some embodiments, a spatial light system may instead or also include technology that enables wired connection between the spatial light system and other devices.

In some embodiments, a spatial light system may include integrated sensors to detect objects and surfaces (e.g., people and specular surfaces such as mirrors or windows) within a room, and/or to detect light levels within a room. The sensors may also determine depth of objects or surfaces, and types of objects or surfaces within a room. In some embodiments, at least one of the sensors may use infrared (IR) light to detect objects or surfaces. Information about objects and surfaces within a room collected by the sensors may be fed back to a controller of the spatial light system, which may use the information in controlling operation of the projection units of the spatial light system.

A spatial light system may include a controller comprising one or more processors to which projection units are connected, for example via flex strips. The controller may drive or control the projection units on the flex strips to emit light into a room according to image content and room information. The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents. For example, one or more sensors may collect lighting information for existing artificial and natural light sources in a room, such as lamps, televisions, and windows. The room information may, for example, be used to determine depths at which "pixels" projected by the projection units are to be focused, objects or surfaces to be illuminated or not illuminated, and so on. In some embodiments, the room information may be obtained from an external device, for example via a wireless connection to the system. In these embodiments, the system controller may be relatively simple, projecting images onto surfaces based on the room information obtained from an external device. In some embodiments, the room information may be generated by the system controller from data obtained from one or more sensor modules of the system, for example sensor modules coupled to the flex strips on which the projection units are coupled. In these embodiments, the system controller may be relatively more complex to provide the needed processing power.

Image content to be projected by the spatial light system may be obtained from an external device, for example via a wireless connection, or alternatively may be generated based on image information stored locally in memory of the system. The spatial light system may, for example, project illuminating light, AR imagery, patterns, or other image content onto the floor, walls, and/or ceiling of a room based on the image content and room information. However, the system may also intelligently light or augment particular objects found within a room, and/or intelligently not illuminate certain surfaces or objects such as windows or television screens, or persons, within a room, based on the room information obtained from an external device or generated by the system controller from data collected by sensors.

In some embodiments, the room information may be used by the spatial light system to detect surfaces, objects, and motion within a room, and may also be used to identify particular objects including but not limited to specular surfaces such as mirrors, windows, and television screens, and persons within the room. This information may be used to adjust projection of light from the spatial light system. For example, upon detecting a person within the room, the spatial light system may lower the intensity of the light projected towards that person by one or more of the projection units to avoid "dazzling" the person with intense light. As another example, the spatial light system may adjust one or more of the projection units to focus the projected imagery at different depths as detected by the sensors. As yet another example, the spatial light system may lower the intensity of projected light, or not project light, towards a reflective surface to avoid unwanted reflective light from the reflective surface. As still yet another example, the spatial light system may project light towards an identified object or objects within the room to intentionally highlight or "spotlight" those objects. As still yet another example, a spatial light system may include one or more sensors that allow the system to track moving objects or persons in a room; the spatial light system may then project light with respect to the tracked object or person to augment that object or person, for example to project light in front of a moving toy car to provide the appearance of headlights of the car, or to "spotlight" a moving person in a room.

In some embodiments, the system may project 2D images of AR or other image content onto surfaces in the room, for example at least portions of the walls, ceiling, and floors, or onto objects within the room. In some embodiments, the image content projected by the system may be grayscale or color image content. Projected AR content may, for example, display swaying shadows of trees on the walls and ceiling, images of animals, birds flying, clouds, or of rain falling. Instead of or in addition to projecting image content in motion, still image content may be projected. In some embodiments, the system may also be configured to emit diffuse light to illuminate a room when not emitting light representing AR or other image content. In some embodiments, the system may emit spatial light in combination with other devices, for example to provide the expansion of television content. In some embodiments, the system may emit light to provide a low resolution version of a virtual environment that a person in the room is experiencing in virtual reality (e.g., using a headset or head-mounted device (HMD)) to give context to other people in the room without virtual reality headsets. In some embodiments, the system may emit light to complement a mixed reality environment being experienced by a person using an augmented reality headset by using lighting to improve contrast and colors viewed in the headset.

BRIEF DESCRIPTION OF THE DRAWINGS

FIGS. 2A through 2C illustrate a lamp configuration for a spatial light system, according to some embodiments.

FIGS. 4A through 4C illustrate a cylinder configuration for a spatial light system, according to some embodiments.

FIGS. 5A through 5C illustrate a sphere configuration for a spatial light system, according to some embodiments.

Figure 1A:
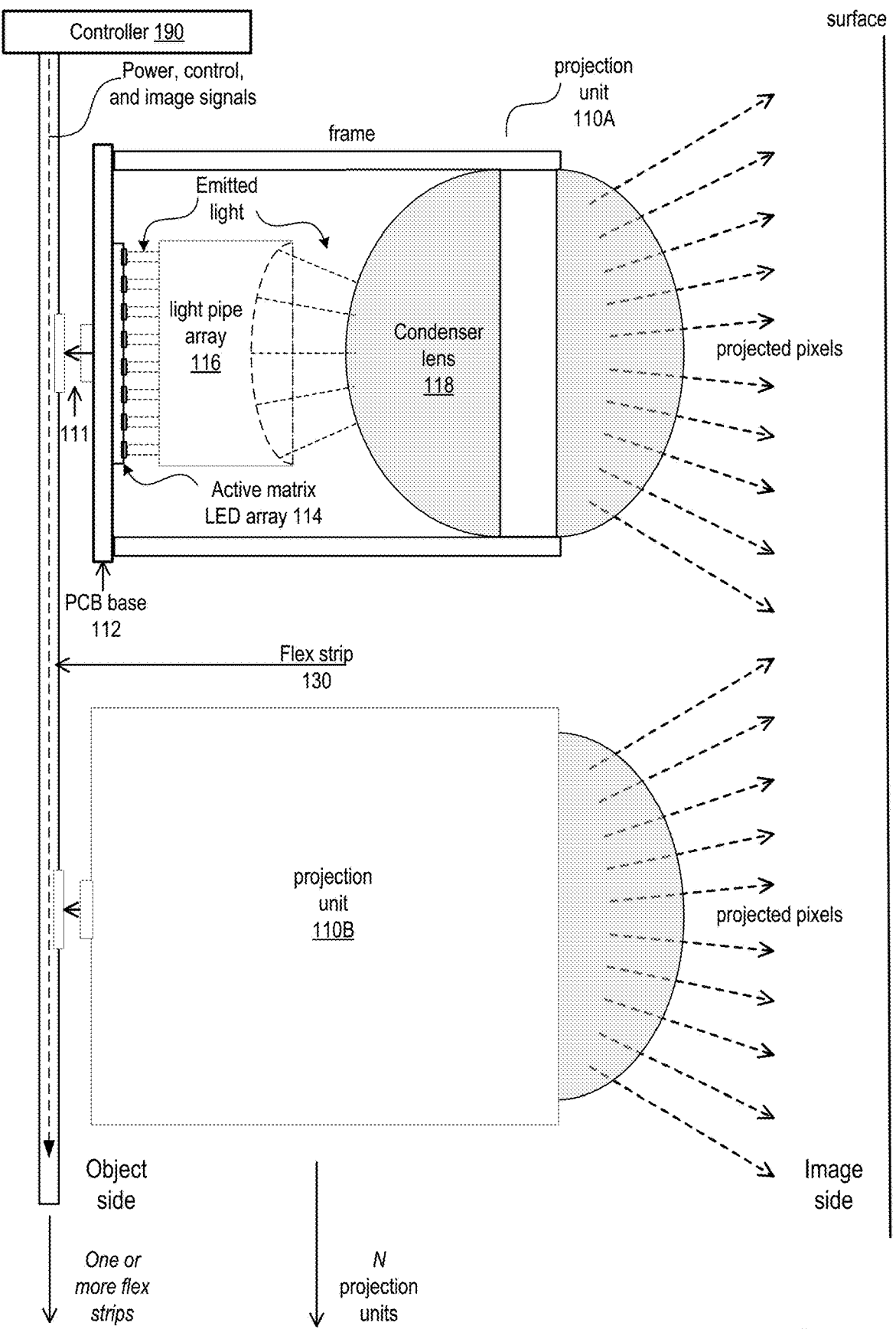
FIGS. 1A through 1G illustrate projection units mounted on a flexible strip, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for emitting light including light representing augmented reality (AR) content into environments such as rooms are described. Embodiments of a spatial light system are described that may, for example, be used to project AR content onto one or more surfaces of a room. In some embodiments, a spatial light system may include two or more light-emitting diode (LED) projection units for emitting light representing AR content onto surfaces within a room, onto object(s) within a room, or onto surfaces in a portion of a room. In some embodiments, a spatial light system may also be configured to emit diffuse light to illuminate a room, object(s) within a room, or a portion of a room when not emitting light representing AR content.

In some embodiments, two or more projection units may be connected to a flexible strip (referred to as a flex strip) that provides power and data (e.g., serial data) to the projection units. Alternatively, power and/or data for the projection units may come from another source. Two or more flex strips may be connected together. The flex strips of projection units provide a serially-connected, flexible modular architecture for spatial light systems that allow the projection units to be conformed to a variety of configurations and shapes as described herein. However, in some embodiments, the projection units described herein may be mounted to a fixed surface that includes connections for power and/or data for the modules. In some embodiments, one or more other modules such as sensor modules (depth sensors, light sensors, motion sensors, cameras, etc.) may also be connected to the flex strips in addition to the projection units, for example to provide depth information for surfaces and object in the room, or to detect presence and motion of persons in the room.

Embodiments of a spatial light system may include a controller comprising one or more processors to which the flex strips are connected and that drives or controls the projection units on the flex strips to emit light into a room according to image content and room information.

The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents. The room information may, for example, be used to determine depths at which "pixels" projected by the projection units are to be focused, objects or surfaces to be illuminated or not illuminated, and so on. In some embodiments, the room information may be obtained from an external device, for example via a wireless connection to the spatial light system. In these embodiments, the controller may be relatively simple, projecting images onto surfaces based on the room information obtained from an external device. In some embodiments, the room information may be generated by the controller from data obtained from one or more sensor modules coupled to the flex strips. In these embodiments, the controller may be relatively more complex to provide the needed processing power.

The image content to be projected may be obtained from an external device, for example via a wireless connection to the spatial light system, or alternatively may be generated based on image information stored locally in memory on the spatial light system. In some embodiments, the spatial light system may provide room illumination, as per conventional room lighting (e.g., light fixtures or light bulbs), as well as projecting AR or other imagery onto one or more surfaces in the room. A spatial light system may, for example, project illuminating light, AR imagery, patterns, or other image content onto the floor, walls, and/or ceiling of a room. However, the spatial light system may also intelligently light or augment particular objects found within a room, and/or intelligently not illuminate certain surfaces or objects such as windows or television screens, or persons, within a room.

The room information may be used by the spatial light system to detect surfaces, objects, and motion within a room, and may also be used to identify particular objects including but not limited to specular surfaces such as mirrors, windows, and television screens, and persons within the room. This information may be used to adjust projection of light from the spatial light system. For example, upon detecting a person within the room, the spatial light system may lower the intensity of the light projected towards that person by one or more of the projection units to avoid "dazzling" the person with intense light. As another example, the spatial light system may adjust one or more of the projection units to focus the projected imagery at different depths as detected by the sensors. As yet another example, the spatial light system may lower the intensity of projected light, or not project light, towards a reflective surface to avoid unwanted reflective light from the reflective surface. As still yet another example, the spatial light system may project light towards an identified object or objects within the room to intentionally highlight or "spotlight" those objects.

In some embodiments, the spatial light system may project 2D images of AR or other image content onto surfaces in the room, for example at least portions of the walls, ceiling, and floors, or onto objects within the room. In some embodiments, the image content projected by the spatial light system may be grayscale or color image content. Projected AR content may, for example, display swaying shadows of trees on the walls and ceiling, images of animals, birds flying, clouds, or of rain falling. Instead of or in addition to projecting image content in motion, still image content may be projected. In some embodiments, the spatial light system may also be configured to emit diffuse light to illuminate a room when not emitting light representing AR or other image content. In some embodiments, the spatial light system may replicate or simulate all or a portion of generic illumination that typical light sources such as floor, ceiling, wall, or tabletop lamps or light fixtures provide. In some embodiments, the system may emit spatial light in combination with other devices, for example to provide the expansion of television content. In some embodiments, the system may emit light to provide a low resolution version of a virtual environment that a person in the room is experiencing in virtual reality (e.g., using a headset or head-mounted device (HMD)) to give context to other people in the room without virtual reality headsets. In some embodiments, the system may emit light to complement a mixed reality environment being experienced by a person using an augmented reality headset by using lighting to improve contrast and colors viewed in the headset.

In some embodiments, the spatial light system controller generates or receives video signals (e.g., from an external device such as an AR/VR device, pad or tablet device, or smartphone) and processes the signals into separate video drives for each projection units so that the final image(s) projected by all the projection units is correctly stitched and continuous. The controller then provides the correct pulse width modulation to each LED pixel of each projection unit so that the correct light output is achieved to project the imagery.

In some embodiments, two or more spatial light systems in a room may be configured to communicate using light as a form of "wireless" information transfer medium. In some embodiments, a spatial light system may be configured to pulse light at a frequency that is not detectable to the human eye; the pulsed light can carry information about the device to one or more other spatial light systems or other devices in a room. The information conveyed may, for example, include information about the spatial light system's location in the room, current intensity, or any other relevant information about the device and room environment that the spatial light systems need to operate collaboratively. Further, a spatial light system may include light sensors to receive pulsed light signals from other devices in a room, and the spatial light system controller may be configured to generate and interpret the pulsed light signals. This allows two or more spatial light systems in a room to communicate in an open manner without having to physically connect the devices, and makes it easy to scale spatial light system installations in a room. Using pulsed light signals, two or more spatial light system devices just need to be able to "see" each other in a room to communicate directly via light that they already emit. Note that visible or non-visible wavelengths of light, or both, may be used as a pulsed light information transfer medium.

In some embodiments, light from a spatial light system may be used to power another spatial light system within a room, or to power other devices such as sensors within a room. Further, a spatial light system may include technology that allows the spatial light system to be powered by light from another spatial light system or other light source.

In some embodiments, components of a spatial light system including but not limited to the projection units may be packaged or contained within an enclosure or "bulb-like" structure of a transparent or semi-transparent material (e.g., glass or plastic). In some embodiments, a spatial light system may be connected to electrical power, for example via a conventional light socket or via a conventional power plug. Embodiments of a spatial light systems as described herein, may, for example, be hung from a ceiling, mounted on a wall or object, or mounted on floor or table stands.

While embodiments of a spatial light system are generally described as including flex strips with pluggable projection units (and possibly other modules such as sensors) that are applied to the outer surface of an object such as a cylinder or sphere, or to a curved or flat surface of an object such as a disk, and in which the flex strip provides connectivity between the modules and the controller, in some embodiments an object such as a cylinder, sphere, or disk may be manufactured with integrated wiring that connects the projection (and other) modules to the controller, and via which the controller drives the projection units.

While the controller is generally described as being a component of the spatial light system, and thus may be contained within the spatial light system enclosure, in some embodiments at least a portion of the controller may be external to the spatial light system enclosure. Further, in some embodiments, at least some of the functionality of the controller as described herein may be performed by a device external to the spatial light system that communicates with the system via a wired or wireless connection.

In some embodiments, in addition to room information that identifies surfaces, objects, and other information about a room in which the spatial light system is in, the spatial light system may obtain or store information about the layout and orientation of the projection units (and sensor modules if present) of the system. This information may provide a mapping between particular projection units and the content of the room, and may be used along with the room information in controlling the projection units, and the LEDs within projection units, when projecting light into the room environment.

In some embodiments, a spatial light system may include one or more actuators that can automatically move the system, for example under control of an external device. As an example, a lamp or disk spatial light system may move to illuminate different portions of a surface or room, or to track an object or person in motion. As another example, a cylinder or sphere spatial light system may be rotated within a room.

In some embodiments, a spatial light system or one or more projection units of a spatial light system may include at least one camera for tracking objects or persons within a room. In some embodiments, a camera may be implemented as a module that plugs into a flex strip. In some embodiments, at least one of the projection units may include an embedded camera. In some embodiments, the embedded camera may be confocal with the light projection mechanism of the projection unit; that is, the camera uses the same optical path as the light projection mechanism of the projection unit to capture images or video of a portion of a room. Tracking an object or person may, for example, allow the spatial light system to project light with respect to a moving object or person to augment that object or person, for example to project light in front of a moving toy car to provide the appearance of headlights of the car, or to "spotlight" a moving person in a room.

In some embodiments, an external device such as a smartphone may include applications or interfaces that allow a user to control operations of the spatial light system, for example to select content to be projected, to switch between projecting content and room illumination, to control the brightness of the system, to signal actuators to reposition the spatial light system, and so on.

FIGS. 1A through 1G illustrate projection units mounted on a flexible strip, according to some embodiments.

FIG. 1A illustrates an example projection unit 110A coupled to a flex strip 130, according to some embodiments. Note that the shape, size, and configuration of the components shown in FIG. 1A are given by way of example, and are not intended to be limiting. In some embodiments, a projection unit 110A may include, but is not limited to, a substrate or base 112 (e.g., a printed circuit board (PCB)), an active matrix LED array 114 coupled to the base 112, a light pipe array 116, and condensing optics (condenser lens 118), all contained within a frame that is mounted to the base 112. While not shown, in some embodiments, a projection unit 110A may also include other non-visible light emitters that may, for example, be used to communicate with other devices using pulsed light signals, and/or to excite other components (e.g., phosphors). The projection unit 110A may couple to/plug into a flex strip 130 via one or more connections 111 between the PCB base 112 and the flex strip 130. In some embodiments, two or more projection units 110 (110A and 110B shown in this example) may be coupled to a flex strip 130, a flex strip 130 may be coupled to a spatial light system controller 190, and two or more flex strips 130 may be coupled together to form a "chain" of flex strips 130. The flex strips 130 can then be conformed to a shape of the spatial light system (e.g., a disk, sphere, cylinder, etc.).

Figure 1B:
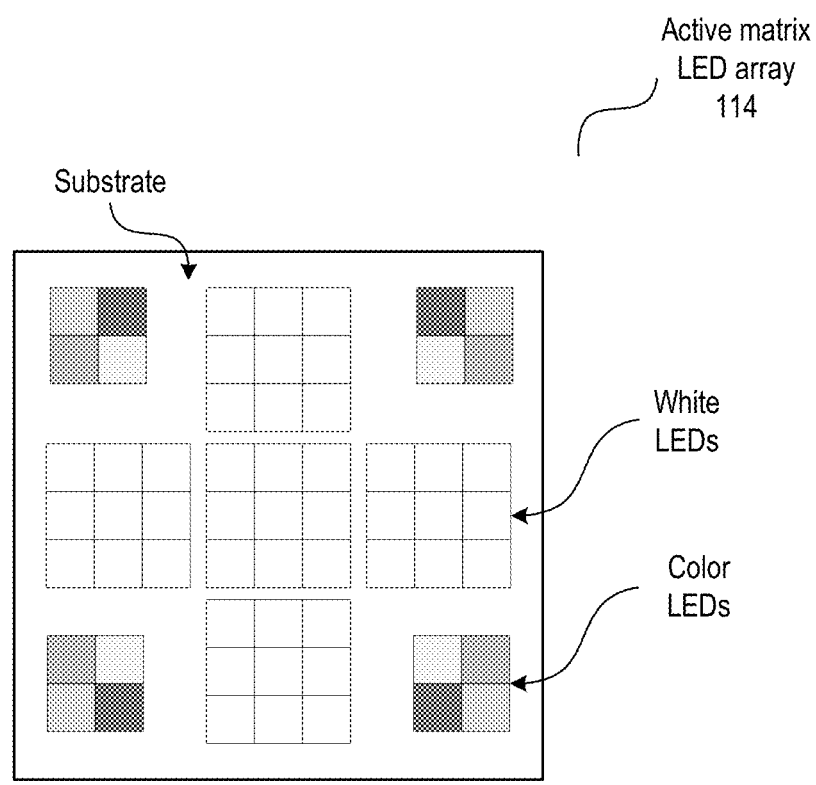

The flex strip 130 includes wiring that provides control and image signals, as well as power, to a projection unit 110A via connection 111. The control and image signals selectively drive individual LEDs on LED array 114 to turn on or off individual ones of the LEDs, change the intensity or depth of focus, etc. of the LEDs. The LEDs may include white as well as color LEDs, for example as shown in FIG. 1B. In some embodiments, the LEDs may include LEDs configured to emit light in non-visible illumination wavelengths, or in any combination of wavelengths including but not limited to multiple white spectrums to form a broader spectrum of illumination. The LEDs selectively emit light to the light pipe array 116. Broadly defined, a light pipe is an optical components that may be used to increase the uniformity of a light source and/or to direct light. Light pipes may also be referred to as homogenizing rods, light guides, homogenizers, or light funnels. While embodiments are generally described in which projection units include light pipe arrays, other combination of light collection or light shaping optical elements may be used.

In some embodiments, there is one light pipe per LED in the light pipe array 116. The light pipes in the light pipe array 116 guide the light emitted by the LEDs and emit the light towards the condenser lens 118. Broadly defined, a condenser lens is an optical lens which renders a divergent beam from a point source into a parallel or converging beam to illuminate an object or surface. The condenser lens 118 affects the emitted light received from the light pipe array 116 to project pixels (or portions of pixels) onto a surface or object in the room. Note, however, that a projected "pixel" on a surface may be formed by light projected from two or more projection units 110. In other words, the light projected by a given projection unit 110 (e.g., 110A) may overlap with the light projected by one or more other (typically adjacent) projection units 110 (e.g., 110B) to form "pixels" on surface(s) within a room, all under control of controller 190; collectively the "pixels" form image(s) on the surface(s).

As previously mentioned, in some embodiments the individual projection units 110 may be controlled by controller 190 via a serial communications protocol through flex strip 130. In some embodiments, the serial communications protocol may be SDI (serial digital interface). However, other communications protocols may be used. In some embodiments, SDI may provide a 30 MHz rate at 16 bit color depth, and may maintain a 60 Hz per second frame rate.

In some embodiments, one or more projection units 110 of a spatial light system may be configured to pulse light at a frequency that is not detectable to the human eye; the pulsed light can carry information about the device to one or more other spatial light systems or other devices in a room. The information conveyed may, for example, include information about the spatial light system's location in the room, current intensity, or any other relevant information about the device and room environment that the spatial light systems need to operate collaboratively. Further, a spatial light system may include light sensors to receive pulsed light signals from other devices in a room, and the spatial light system controller 190 may be configured to generate and interpret the pulsed light signals. Note that visible or non-visible wavelengths of light, or both, may be used as a pulsed light information transfer medium.

FIG. 1B illustrates an example active matrix LED array 114, according to some embodiments, and is not intended to be limiting. In this example, there are five 3×3 squares of white LEDs arranged in a cross pattern, and four groups of color LEDs with four color (e.g., red, green, blue, and yellow) in each group, for a total of 45+16=61 LEDs. While FIG. 1B shows the individual LEDs as adjacent squares for illustrative purposes, in practice there may be gaps between the individual LEDs.

In some embodiments, the spatial light system performs color mixing in the system. A given pixel on a surface may thus be formed of white light from one or more of the white LEDs in one or more of the projection units 110, or a mix of white and color light from the white and color LEDs in one or more of the projection units 110. In some embodiments, the LEDs may include LEDs configured to emit light in non-visible illumination wavelengths, or in any combination of wavelengths including but not limited to multiple white spectrums to form a broader spectrum of illumination.

Figure 1C:
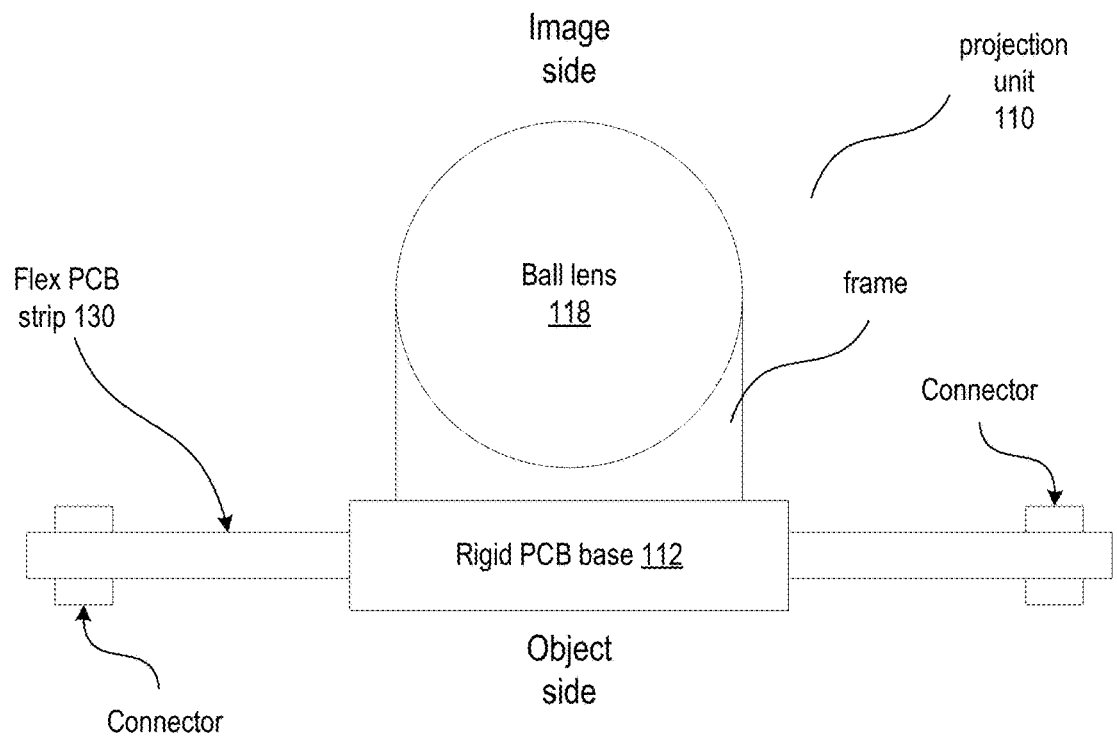
Figure 1D:
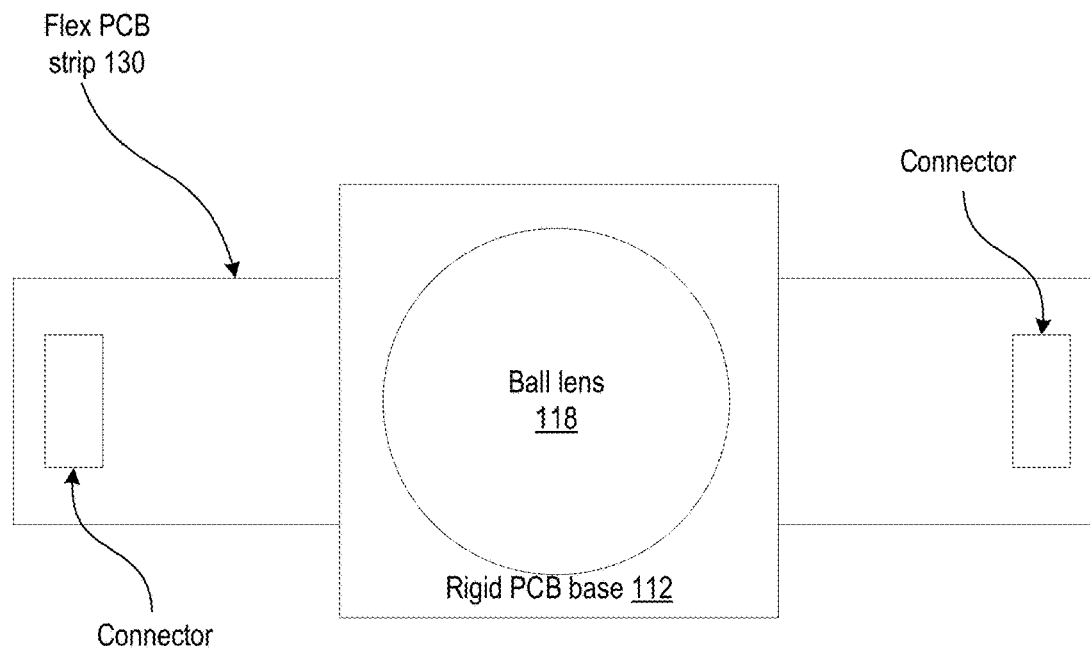

FIGS. 1C and 1D graphically illustrate an example projection unit 110 attached to a flex PCB strip 130, according to some embodiments. FIG. 1C shows a side view of a flex PCB strip 130 and projection unit 110. FIG. 1D shows a top view of the flex PCB strip 130 and projection unit 110 of FIG. 1C. A flex strip may be a flexible PCB strip 130 that includes one or more connectors. Projection unit 110 is attached to the flex PCB strip 130 via corresponding connectors on a rigid PCB base 112. A condenser lens 118 (in this example, a ball lens) is mounted on a frame above the rigid PCB base 112. While not shown, the projection unit 110 may also include, but is not limited to, an LED array and light collection or light shaping optical elements such as a light pipe array.

Figure 1E:
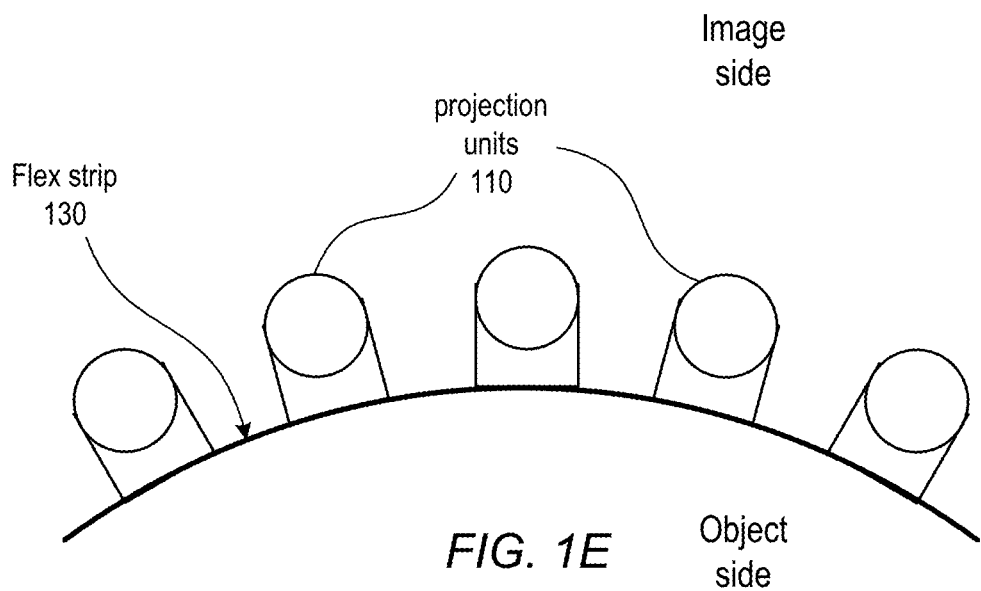
Figure 1F:
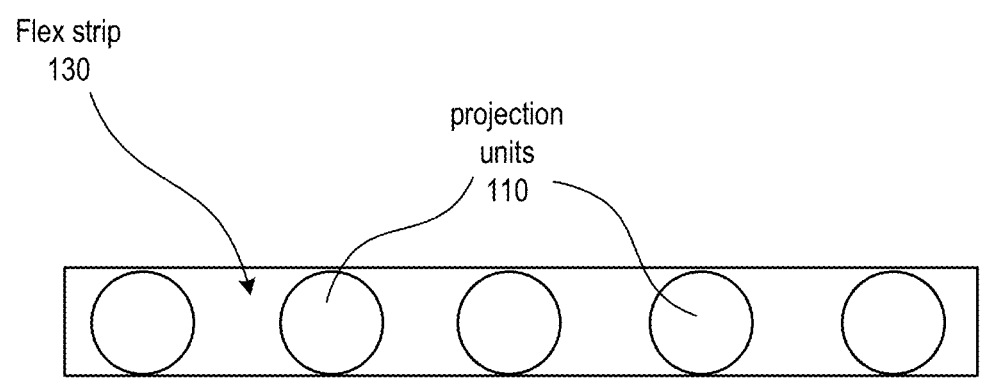

FIGS. 1E and 1F graphically illustrate a flex strip 130 with multiple projection units 110 attached to the strip 130. FIG. 1E shows a side view of a flex strip 130 bent to conform to a convex surface. Note, however, that a flex strip 130 may be conformed to a concave or flat surface, or to an irregular surface. FIG. 1F shows a top view of the flex strip 130 of FIG. 1E. While this example shows five projection units 110 on the strip 130, there may be more or fewer modules 110 on a strip 130. In some embodiments, two or more strips 130 may be connected to cover a given shape of a spatial light system. In some embodiments, a strip 130 may include one or more sensor modules as well as projection units 110 that collect data about the room that can be used to generate room information (e.g., surface depths, lighting, specular surfaces, motion, object detection and identification, etc.). The room information may be used by the spatial light system to detect surfaces, objects, and motion within a room, and may also be used to identify particular objects including but not limited to specular surfaces such as mirrors, windows, and television screens, and persons within the room. This information may be used to adjust projection of light from the spatial light system.

As shown in FIGS. 1A, 1C, and 1E, the side of the projection units 110 that contain the LED array 114 and that are connected to the flex strip 130 may be referred to as the object side of the modules 110, while the side of the projection units 110 that contain the condenser lens 118 and from which light is emitted may be referred to as the image side of the modules 110.

Figure 1G:
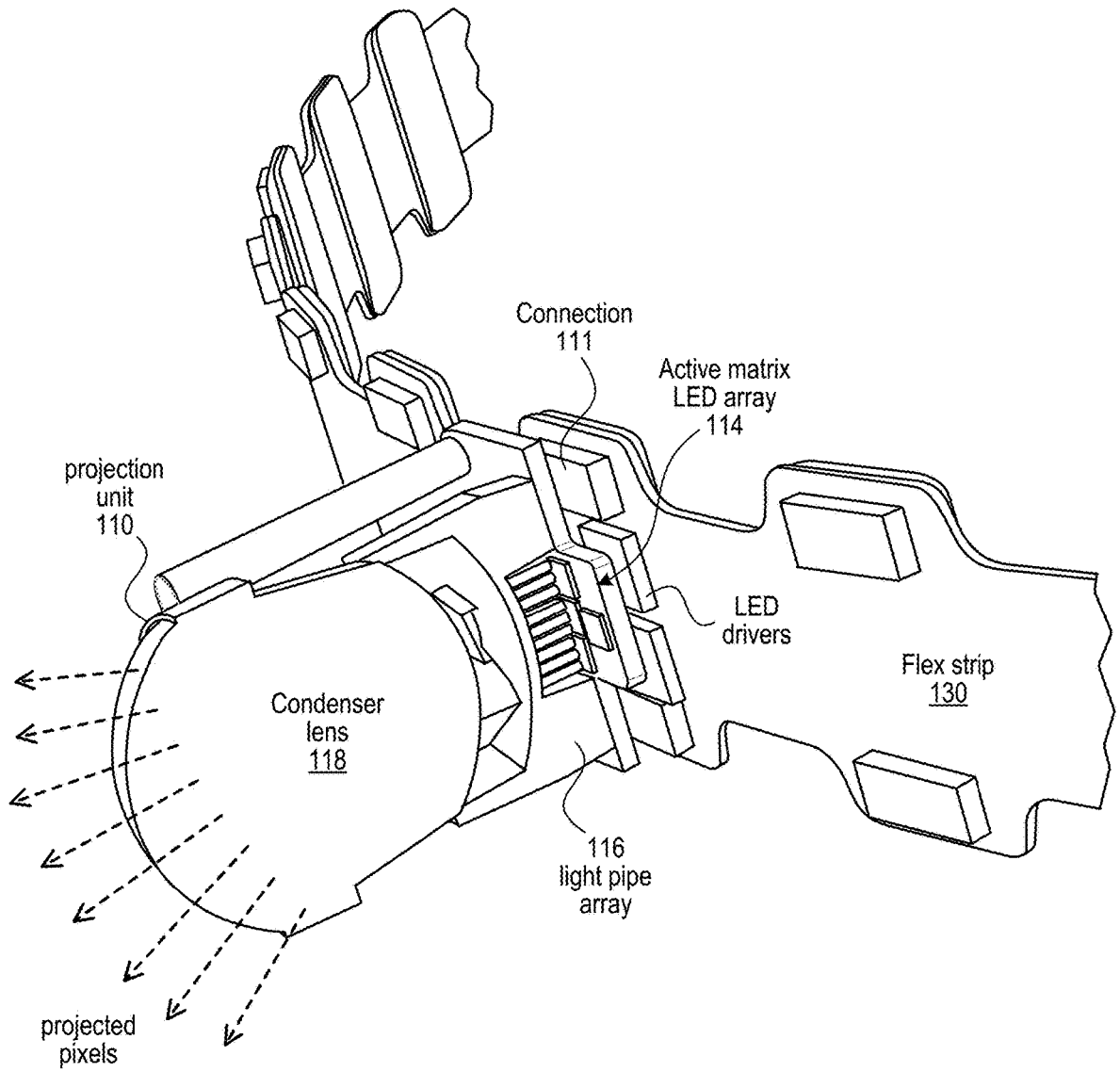

FIG. 1G shows an example 3D view of an example projection unit 110 as illustrated in FIGS. 1A through 1F, according to some embodiments. The projection unit 110 includes, but is not limited to, an active matrix LED array 114 mounted on a PCB base that includes one or more LED drivers, a light pipe array 116, and a condenser lens 118. The PCB base connects 111 to the flex strip 130. The LEDs in the active matrix LED array 114 selectively emit light beams into the light pipes of the light pipe array 116 under control of a controller; the light pipes guide or shape the light beams emitted by the LEDs and emit the light beams towards the condenser lens 118. The condenser lens 118 affects the emitted light beams received from the light pipes and projects the light beams onto a surface. Each projected light beam may form a pixel or a portion of a pixel of an image or other content on the surface.

FIGS. 2A through 4C illustrate example configurations for spatial light systems that use the projection units as illustrated in FIGS. 1A through 1G, according to some embodiments. These configurations are given by way of example, and are not intended to be limiting.

FIGS. 2A through 2C illustrate a lamp 240 configuration for a spatial light system, according to some embodiments. FIG. 2A shows a lamp 240 that may, for example, be used to project images onto the surface of an object such as a table, as shown in FIG. 2C. The lamp 240 may include a projector array 242 as shown in FIG. 2B that includes multiple projection units 210 on flex strip(s) that are arranged in a pattern, in this example a zigzag pattern. FIG. 2A shows an example lamp 240 on a stand; however, a lamp 240 may be hung on a ceiling as shown in FIG. 2C, or mounted on a wall or other object within a room.

Figures 3A, 3B:
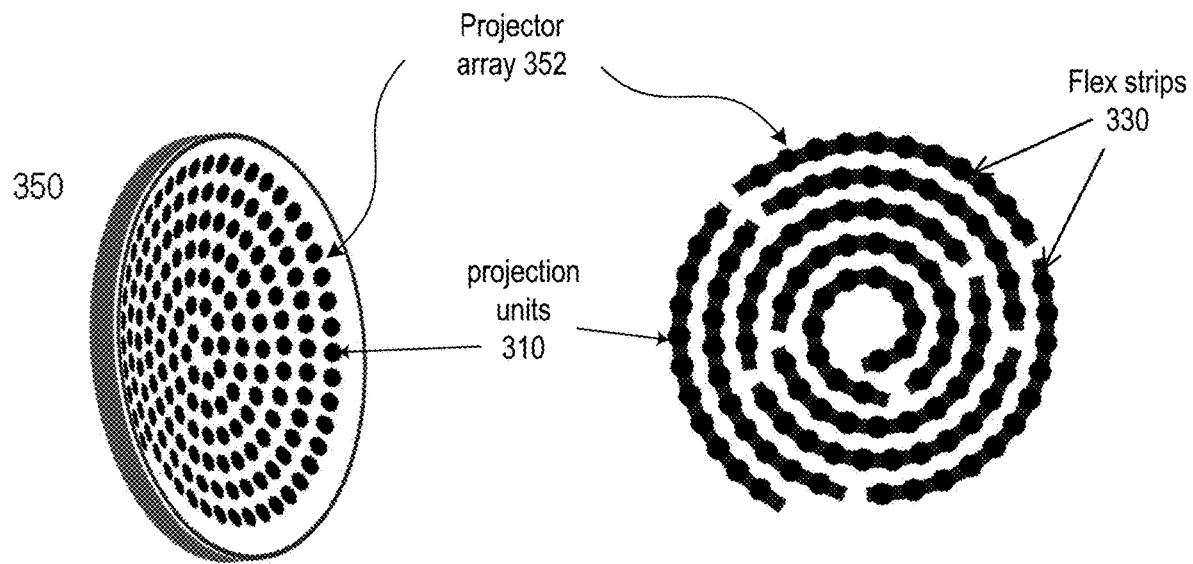
FIGS. 3A through 3C illustrate a disk configuration for a spatial light system, according to some embodiments.
Figure 3C:
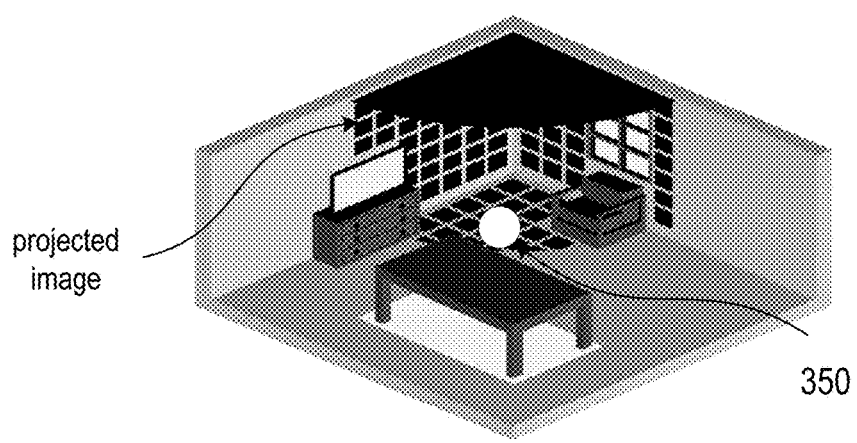

FIGS. 3A through 3C illustrate a disk 350 configuration for a spatial light system, according to some embodiments. FIG. 3A shows a disk 350 that may, for example, be used to project images into a corner of a room, as shown in FIG. 3C. The disk 350 may include a projector array 352 as shown in FIG. 3B that includes multiple projection units 310 on flex strip(s) 330 that are arranged in a pattern, in this example a spiral pattern. Disk 350 may be hung from a ceiling; however, a disk 350 may be mounted on a stand, or mounted on a wall or other object within a room.

FIGS. 4A through 4C illustrate a cylinder 460 configuration for a spatial light system, according to some embodiments. FIG. 4A shows a cylinder 460 that may, for example, be used to project images onto the walls of a room, as well as onto other objects or surfaces, as shown in FIG. 4C. The cylinder 460 may include a projector array 452 as shown in FIG. 4B that includes multiple projection units 410 on flex strip(s) 430 that are arranged in a pattern, in this example a vertical pattern. Cylinder 460 may be hung from a ceiling; however, a cylinder 460 may be mounted on a stand, or positioned on another object within a room.

FIGS. 5A through 5C illustrate a sphere 570 configuration for a spatial light system, according to some embodiments. FIG. 5A shows a sphere 570 that may, for example, be used to project images onto the walls, ceiling, and/or floor of a room, as well as onto other objects or surfaces, as shown in FIG. 5C. The sphere 570 may include a projector array 552 as shown in FIG. 5B that includes multiple projection units 510 on flex strip(s) 530 that are arranged in a pattern, in this example a horizontal pattern. Sphere 570 may be hung from a ceiling; however, a sphere 570 may be mounted on a stand, or positioned on another object within a room.

Figure 6:
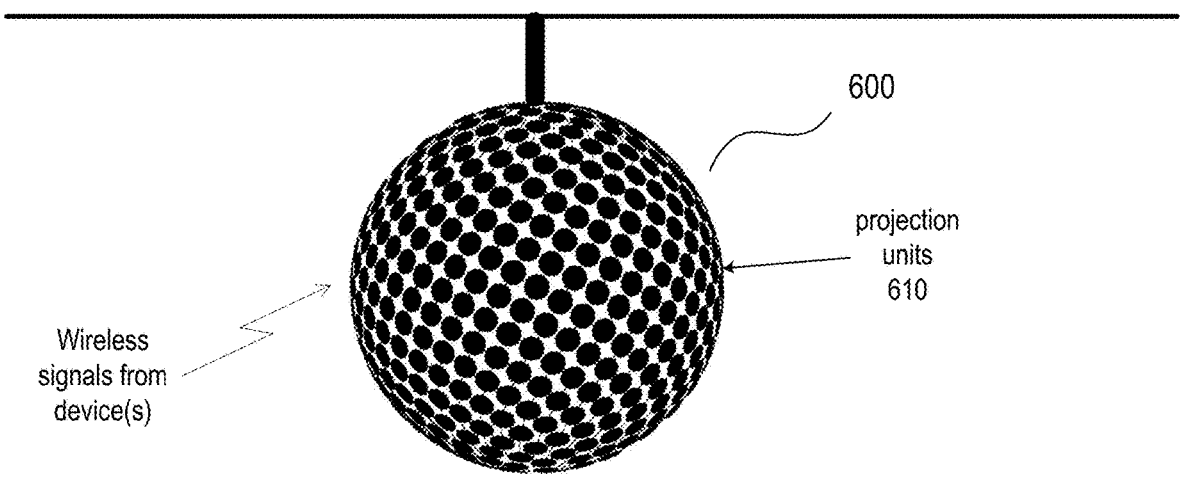
FIG. 6 illustrates an example spatial light system, according to some embodiments.

FIG. 6 illustrates an example spatial light system, according to some embodiments. This example shows a sphere-shaped system 600 as illustrated in FIGS. 5A through 5C; however, the description applies to any configuration. In this example, system 600 is hung from a ceiling, and includes multiple projection units 610. System 600 may receive wireless signals from other devices, for example from smartphones, tablet or pad devices, laptops or other computer systems, AR/VR systems, or other smart devices such as televisions.

System 600 may include a controller comprising one or more processors to which projection units 610 are connected, for example via flex strips as described herein. The controller may drive or control the projection units 610 on the flex strips to emit light into a room according to image content and room information. In some embodiments, the controller may also be configured to cooperate with one or more other systems 600 in a room to collaboratively control lighting within the room. In some embodiments, two or more systems 600 in a room may communicate via pulsed visible or non-visible light signals to exchange information used in collaboratively controlling lighting within a room.

The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents. The room information may, for example, be used to determine depths at which "pixels" projected by the projection units are to be focused, objects or surfaces to be illuminated or not illuminated, and so on. In some embodiments, the room information may be obtained from an external device, for example via a wireless connection to the system 600. In these embodiments, the system 600 controller may be relatively simple, projecting images onto surfaces based on the room information obtained from an external device. In some embodiments, the room information may be generated by the system 600 controller from data obtained from one or more sensor modules of the system 600, for example sensor modules coupled to the flex strips on which the projection units 610 are coupled. In these embodiments, the system 600 controller may be relatively more complex to provide the needed processing power.

Image content to be projected by system 600 may be obtained from an external device, for example via a wireless connection to the system 600, or alternatively may be generated based on image information stored locally in memory of the system 600. In some embodiments, the system 600 may provide room illumination, as per conventional room lighting (e.g., light fixtures or light bulbs), as well as projecting AR or other imagery onto one or more surfaces in the room. System 600, for example, project illuminating light, AR imagery, patterns, or other image content onto the floor, walls, and/or ceiling of a room. However, the system 600 may also intelligently light or augment particular objects found within a room, and/or intelligently not illuminate certain surfaces or objects such as windows or television screens, or persons, within a room, based on the room information obtained from an external device or generated by the system 600 controller from data collected by sensors of the system 600.

In some embodiments, the room information may be used by the spatial light system 600 to detect surfaces, objects, and motion within a room, and may also be used to identify particular objects including but not limited to specular surfaces such as mirrors, windows, and television screens, and persons within the room. This information may be used to adjust projection of light from the spatial light system 600. For example, upon detecting a person within the room, the spatial light system 600 may lower the intensity of the light projected towards that person by one or more of the projection units 610 to avoid "dazzling" the person with intense light. As another example, the spatial light system 600 may adjust one or more of the projection units 610 to focus the projected imagery at different depths as detected by the sensors. As yet another example, the spatial light system 600 may lower the intensity of projected light, or not project light, towards a reflective surface to avoid unwanted reflective light from the reflective surface. As still yet another example, the spatial light system 600 may project light towards an identified object or objects within the room to intentionally highlight or "spotlight" those objects.

In some embodiments, the system 600 may project 2D images of AR or other image content onto surfaces in the room, for example at least portions of the walls, ceiling, and floors, or onto objects within the room. In some embodiments, the image content projected by the system 600 may be grayscale or color image content. Projected AR content may, for example, display swaying shadows of trees on the walls and ceiling, images of animals, birds flying, clouds, or of rain falling. Instead of or in addition to projecting image content in motion, still image content may be projected. In some embodiments, the system 600 may also be configured to emit diffuse light to illuminate a room when not emitting light representing AR or other image content.

In some embodiments, the system 600 may be configured to pulse light at a frequency that is not detectable to the human eye; the pulsed light can carry information about the system 600 to one or more other spatial light systems or other devices in a room. The information conveyed may, for example, include information about the system 600's location in the room, current intensity, or any other relevant information about the system 600 and room environment that the spatial light systems in a room need to operate collaboratively. Further, the system 600 may include light sensors to receive pulsed light signals from other devices in a room, and the system 600 controller may be configured to generate and interpret the pulsed light signals. Note that visible or non-visible wavelengths of light, or both, may be used as a pulsed light information transfer medium.

Figure 7:
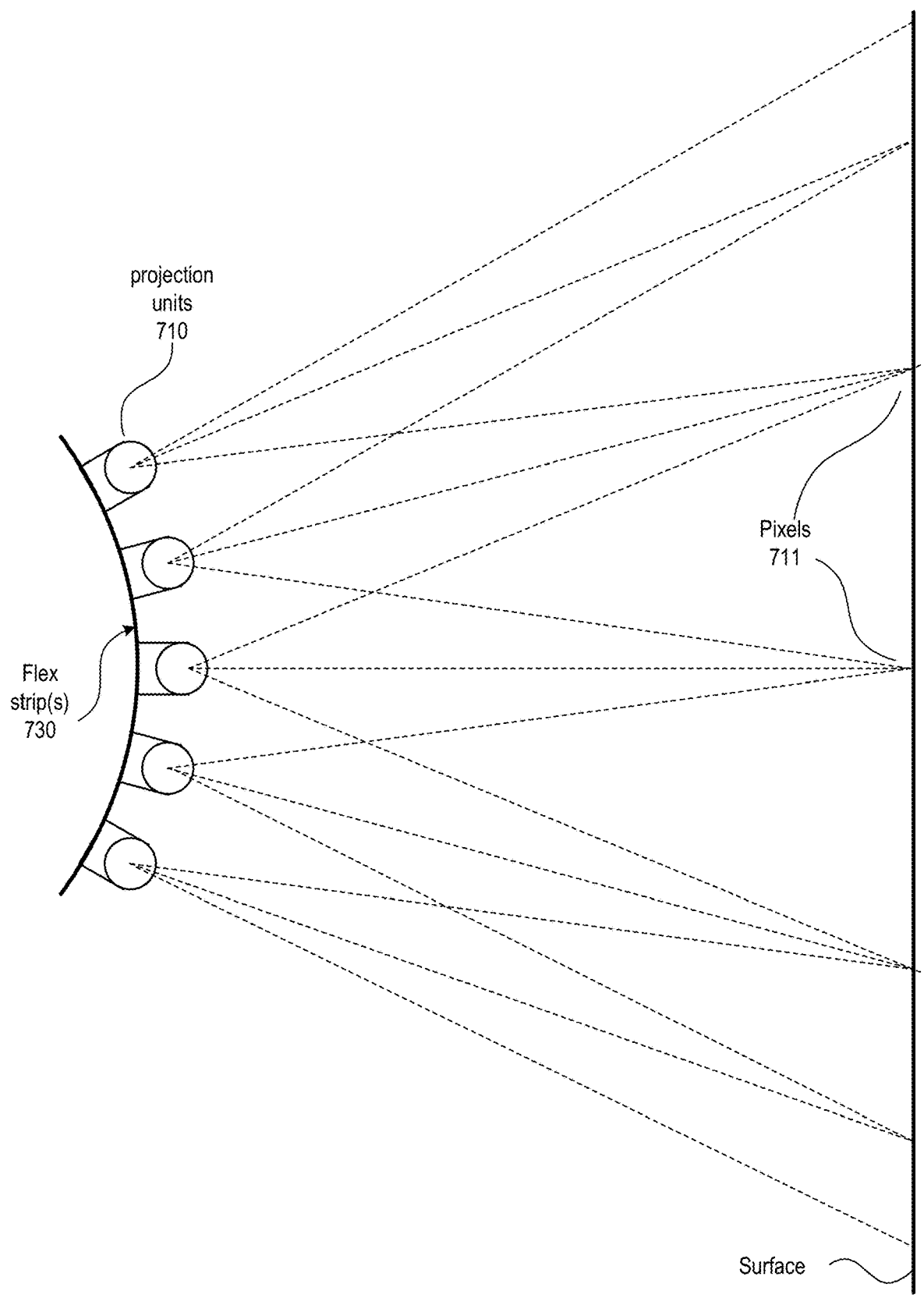
FIG. 7 illustrates projection units projecting light onto a surface to generate pixels, according to some embodiments.

FIG. 7 illustrates projection units projecting light onto a surface to generate pixels, according to some embodiments. A projected "pixel" 711 on a surface may be formed by light projected from two or more projection units 710 of a spatial light system, for example projection units 710 mounted on flex strip(s) 730. In other words, the light projected by a given projection unit 710 may overlap with the light projected by one or more other (typically adjacent) projection units 710 to form "pixels" on surface(s) within a room, all under control of the spatial light system. Collectively the "pixels" form image(s) on the surface(s).

Figure 8:
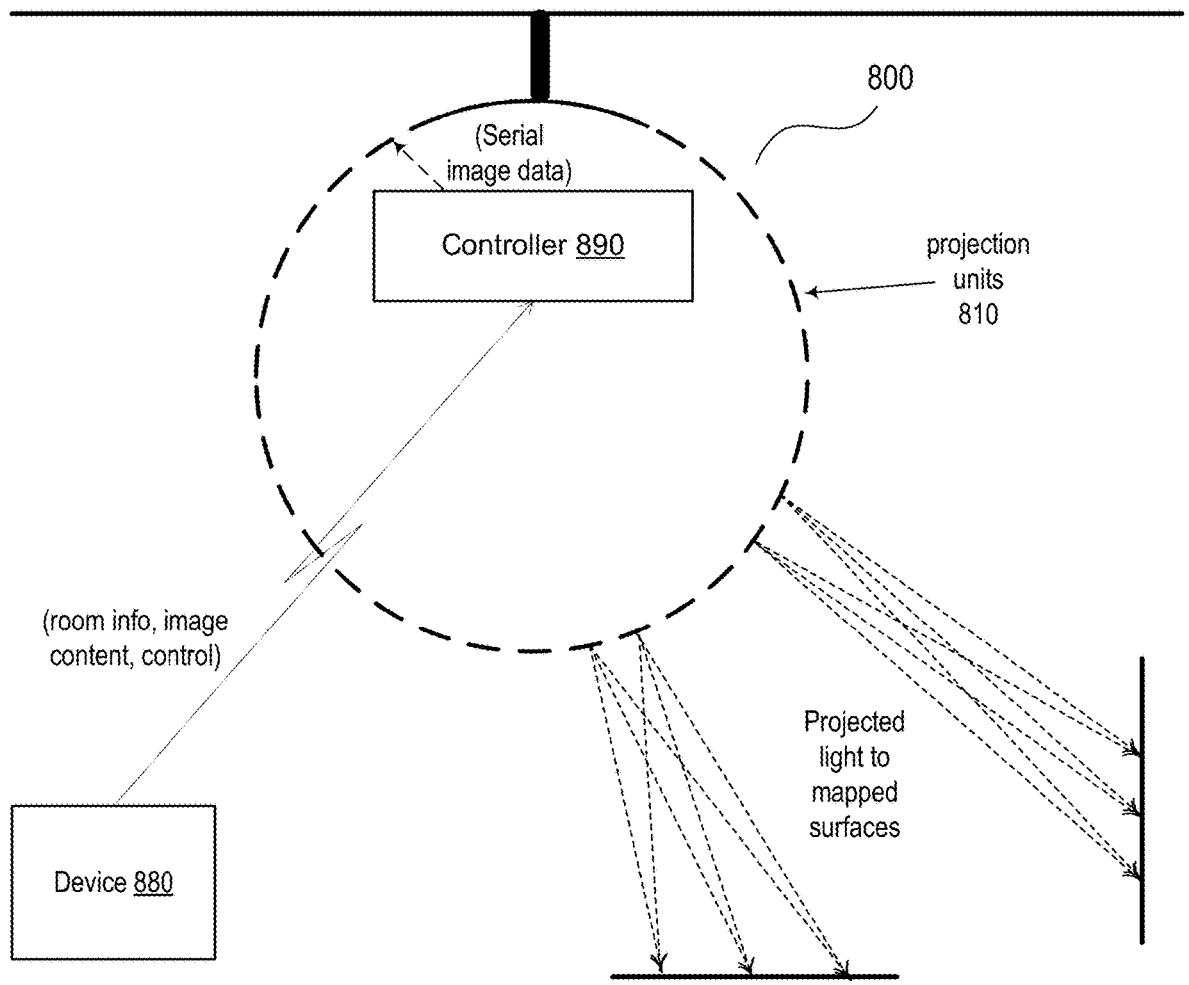
FIG. 8 illustrates components and operation of an example spatial light system that receives room information from an external device, according to some embodiments.

FIG. 8 illustrates components and operation of an example spatial light system that receives room information from an external device, according to some embodiments. This example shows a sphere-shaped system 800 as illustrated in FIGS. 5A through 5C; however, the description applies to any configuration. In this example, system 800 is hung from a ceiling, and includes multiple projection units 810. System 800 may receive wireless signals from a device 880, for example from a smartphone, tablet or pad device, laptop or other computer system, an AR/VR system, or other smart device such as a television.

System 800 may include a controller comprising one or more processors to which projection units 810 are coupled, for example via flex strips as described herein. The controller 890 may drive or control the projection units 810 on the flex strips to emit light into a room according to image content and room information. The room information may be obtained from the device 880. The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents. The room information may, for example, be used to determine direction and depths at which "pixels" projected by the projection units 810 are to be focused, objects or surfaces to be illuminated or not illuminated, and so on. In some embodiments, the controller 890 may also be configured to cooperate with one or more other systems 800 in a room to collaboratively control lighting within the room. In some embodiments, two or more systems 800 in a room may communicate via pulsed visible or non-visible light signals to exchange information used in collaboratively controlling lighting within a room.

Image content to be projected by system 800 may be obtained from an external device 880, for example via a wireless connection to the system 800, or alternatively may be generated based on image information stored locally in memory of the system 800.

In some embodiments, the system 800 may be configured to pulse light at a frequency that is not detectable to the human eye; the pulsed light can carry information about the system 800 to one or more other spatial light systems or other devices in a room. The information conveyed may, for example, include information about the system 800's location in the room, current intensity, or any other relevant information about the system 800 and room environment that the spatial light systems in a room need to operate collaboratively. Further, the system 800 may include light sensors to receive pulsed light signals from other devices in a room, and the system 800 controller may be configured to generate and interpret the pulsed light signals. Note that visible or non-visible wavelengths of light, or both, may be used as a pulsed light information transfer medium.

Figure 9:
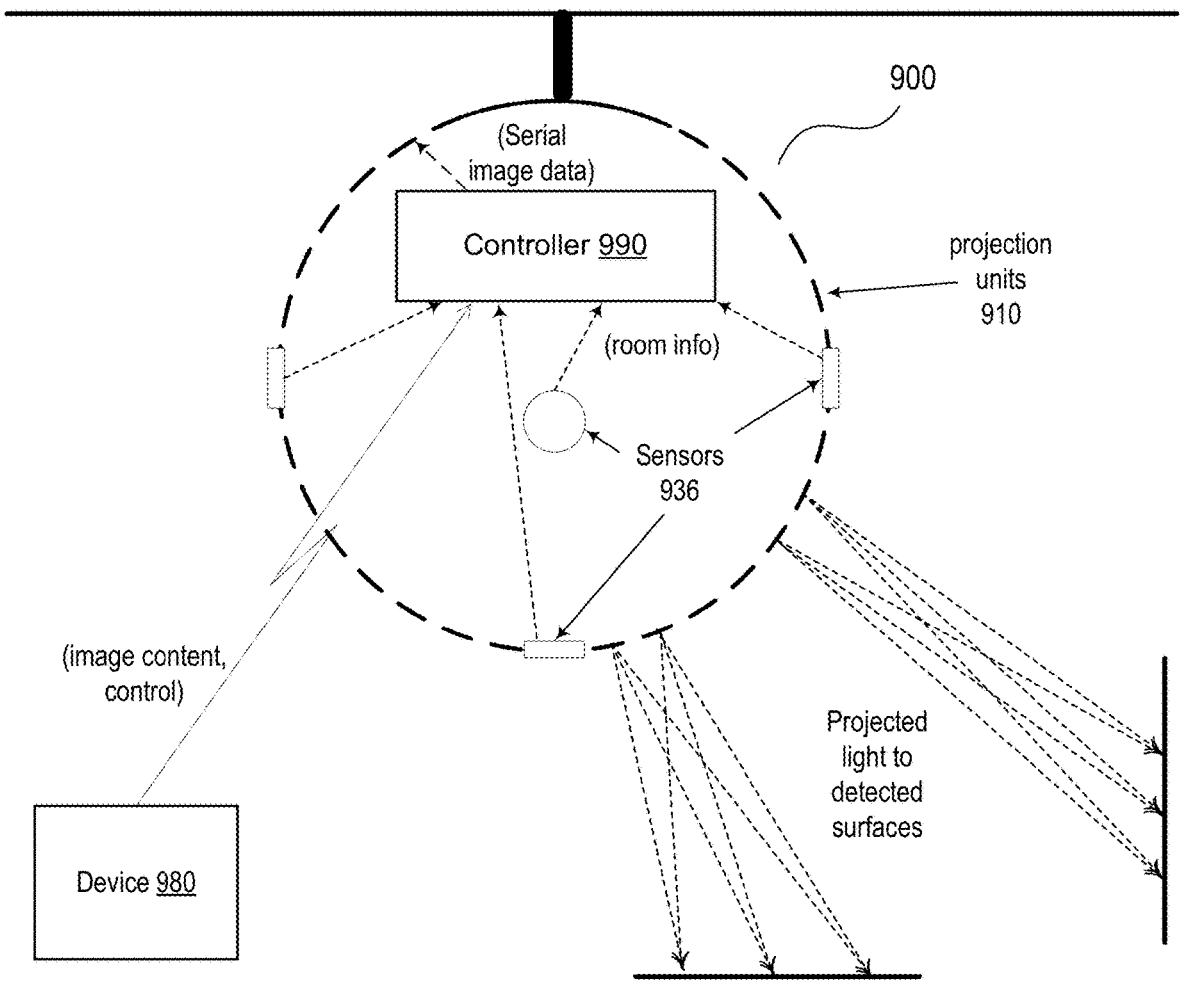
FIG. 9 illustrates components and operation of an example spatial light system that includes sensors that collect data from which room information is generated, according to some embodiments.

FIG. 9 illustrates components and operation of an example spatial light system that includes sensors that collect data from which room information is generated, according to some embodiments. This example shows a sphere-shaped system 900 as illustrated in FIGS. 5A through 5C; however, the description applies to any configuration. In this example, system 900 is hung from a ceiling, and includes multiple projection units 910. System 900 may receive wireless signals from a device 980, for example from a smartphone, tablet or pad device, laptop or other computer system, an AR/VR system, or other smart device such as a television.

System 800 may include a controller comprising one or more processors to which projection units 810 are coupled, for example via flex strips as described herein. The controller 890 may drive or control the projection units 810 on the flex strips to emit light into a room according to image content and room information. In some embodiments, the room information may be generated by the system 900 controller 990 from data obtained from one or more sensor modules 936 of the system 900, for example sensor modules 936 coupled to the flex strips on which the projection units 910 are coupled. The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents. The room information may, for example, be used to determine direction and depths at which "pixels" projected by the projection units 910 are to be focused, objects or surfaces to be illuminated or not illuminated, and so on.

In some embodiments, a spatial light system 900 may include at least one camera for tracking objects or persons within a room. In some embodiments, a camera may be implemented as a sensor module 936 that plugs into a flex strip. Alternatively, in some embodiments, at least one of the projection units 910 may include an embedded camera. In some embodiments, the embedded camera may be confocal with the light projection mechanism of the projection unit 910; that is, the camera uses the same optical path as the light projection mechanism of the projection unit 910 to capture images or video of a portion of a room. Tracking an object or person may, for example, allow the spatial light system to project light with respect to a moving object or person to augment that object or person, for example to project light in front of a moving toy car to provide the appearance of headlights of the car, or to "spotlight" a moving person in a room.

Image content to be projected by system 900 may be obtained from an external device 980, for example via a wireless connection to the system 900, or alternatively may be generated based on image information stored locally in memory of the system 900.

Figure 10:
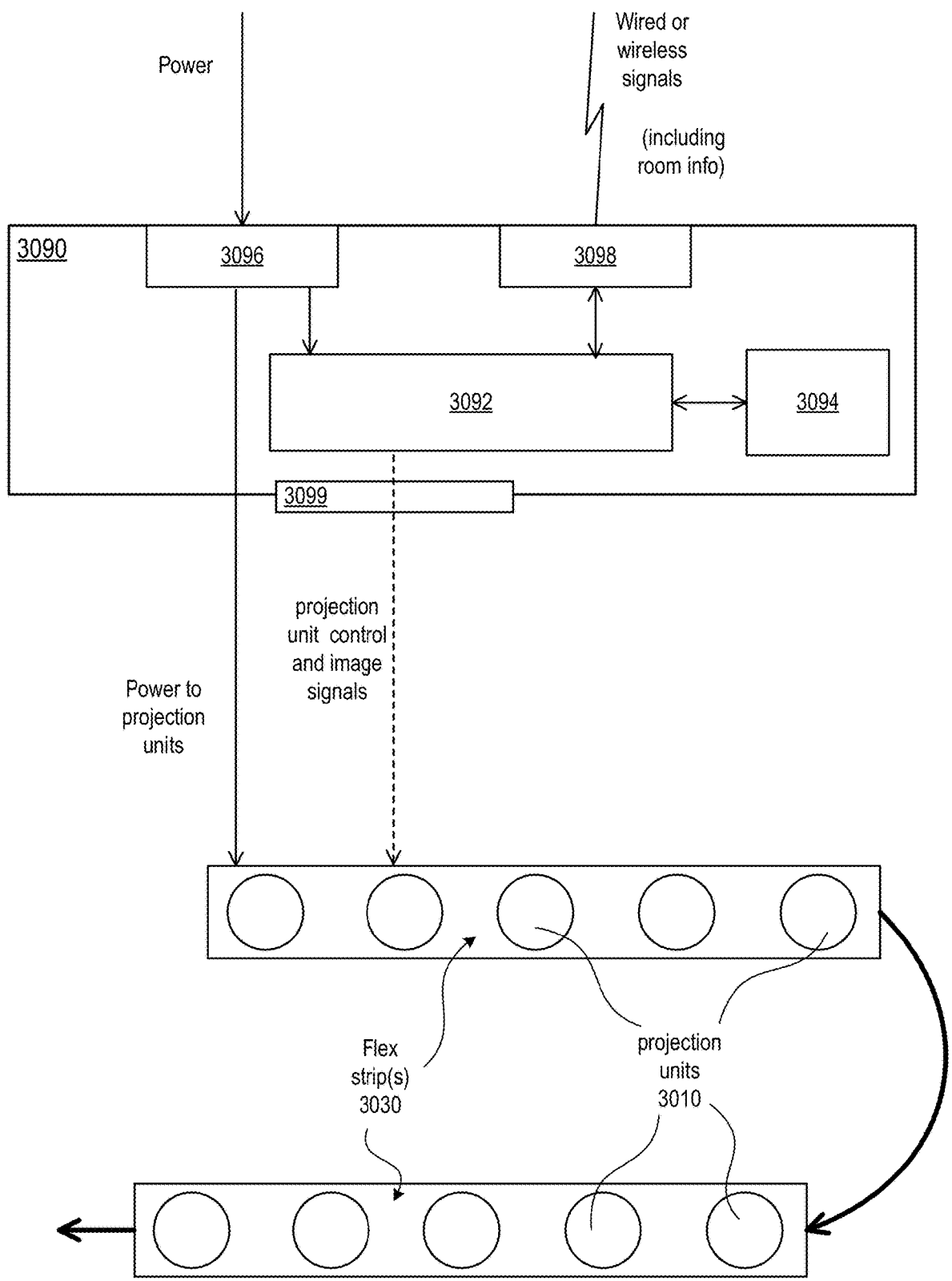
FIG. 10 is a block diagram illustrating components and functionality of an example spatial light system that receives room information from an external device, according to some embodiments.

FIG. 10 is a block diagram illustrating components and functionality of an example spatial light system that receives room information from an external device, according to some embodiments. In some embodiments, a spatial light system as described herein may include a controller 3090 that may implement and control functionality of the spatial light system. In some embodiments, the controller 3090 may include, but is not limited to, one or more processors 3092, memory 3094, power supply 3096 technology, communications interface 3098 technology (e.g., a Bluetooth technology interface, USB interface, etc.), and serial interface 3099 technology (e.g., SDI (serial digital interface) technology).

The controller 3090 may receive room information from an external device via wired or wireless signals to communications interface 3098, for example from a smartphone, tablet or pad device, laptop or other computer system, an AR/VR system, or other smart device such as a television. The room information may be stored to memory 3094. The controller 3090 may drive or control the projection units 3010 on the flex strips 3030 to emit light into a room according to image content and the room information obtained from an external device. The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents. The room information may, for example, be used to determine direction and depths at which "pixels" projected by the projection units 3010 are to be focused, objects or surfaces to be illuminated or not illuminated, and so on.

Image content to be projected by the spatial light system may be obtained from an external device, for example via a wireless connection through interface 3098, or alternatively may be generated by controller 3090 based on image information stored locally in memory 3094.

In some embodiments, controller 3090 may generate or render video or images based on the room information and image content that may be projected by projection units 3010 coupled to the controller 3090 via flex strips 3030 connected to the controller 3090 via serial interface 3099. In some embodiments, controller 3090 may also include memory 3094 that, for example, stores software that is executable by the controller 3090, data that may be used by the controller 3090 including but not limited to room information, and/or that includes buffer(s) for image or video content. In some embodiments, controller 3090 may also include one or more interfaces 3098 that may facilitate communication with an external device via a wired or wireless connection. In some embodiments, the external device may send image content (e.g., video) to be rendered and displayed by the spatial light system to the controller 3090 via interface 3098, and may also send signals to control operations of the spatial light system to the controller 3090 via interface 3098. The external device may be or may include any type of computing system or computing device, such as a desktop computer, notebook or laptop computer, pad or tablet device, smartphone, hand-held computing device, game controller, game system, AR/VR device such as a head-mounted device, smart device such as a smart television, and so on.

In some embodiments the individual projection units 3010 may be controlled by controller 3090 via a serial communications protocol through interface 3199 and flex strip(s) 3030. In some embodiments, the serial communications protocol may be SDI (serial digital interface). However, other communications protocols may be used. In some embodiments, SDI may provide a 30 MHz rate at 16 bit color depth, and may maintain a 60 Hz per second frame rate.

In various embodiments, controller 3090 may be a uniprocessor system including one processor 3092, or a multiprocessor system including several processors 3092 (e.g., two, four, eight, or another suitable number). Controller 3090 may include central processing units (CPUs) that implement any suitable instruction set architecture, and may execute instructions defined in that instruction set architecture. For example, in various embodiments controller 3090 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 3090 may employ any microarchitecture, including scalar, superscalar, pipelined, superpipelined, out of order, in order, speculative, non-speculative, etc., or combinations thereof. Controller 3090 may include circuitry to implement microcoding techniques. Controller 3090 may include one or more processing cores that each execute instructions. Controller 3090 may include one or more levels of caches, which may employ any size and any configuration (set associative, direct mapped, etc.). In some embodiments, controller 3090 may include at least one graphics processing unit (GPU), which may include any suitable graphics processing circuitry. Generally, a GPU may render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 3090 may include one or more other components for processing and rendering video and/or images, for example image signal processors (ISPs), coder/decoders (codecs), etc.

Memory 3094 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Figure 11:
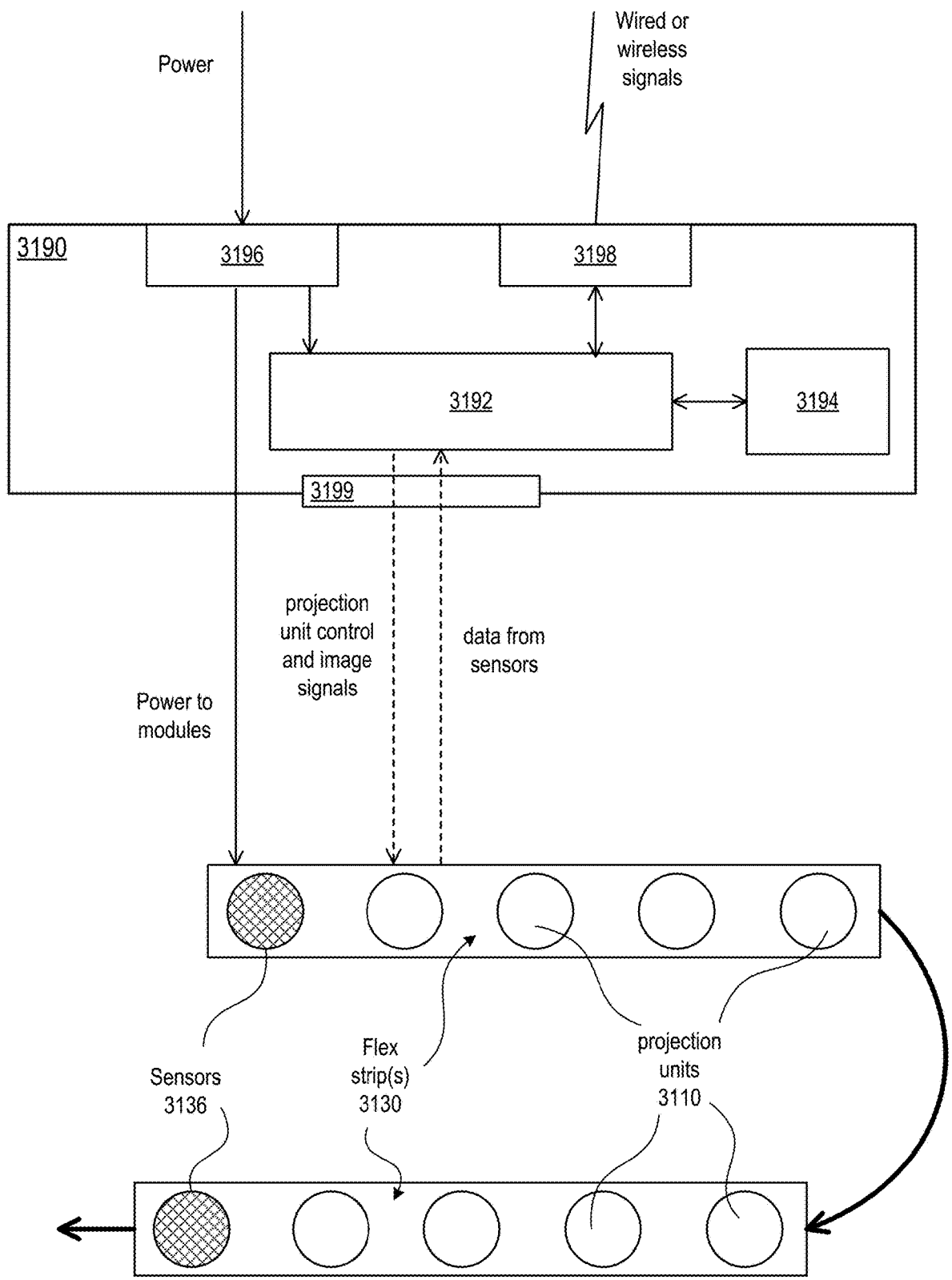
FIG. 11 is a block diagram illustrating components and functionality of an example spatial light system that includes sensors that collect data used to generate room information, according to some embodiments.

FIG. 11 is a block diagram illustrating components and functionality of an example spatial light system that includes sensors that collect data used to generate room information, according to some embodiments. In some embodiments, a spatial light system as described herein may include a controller 3190 that may implement and control functionality of the spatial light system. In some embodiments, the controller 3190 may include, but is not limited to, one or more processors 3192, memory 3194, power supply 3196 technology, communications interface 3198 technology (e.g., a Bluetooth technology interface, USB interface, etc.), and serial interface 3199 technology (e.g., SDI (serial digital interface) technology).

In some embodiments, the spatial light system may include one or more sensor 3136 modules as well as projection units 3110; the sensors 3136 may collect data about the room that can be used to generate room information (e.g., surface depths, lighting, specular surfaces, motion, object detection and identification, etc.) The controller 3090 may obtain data from one or more of the sensors 3136 of the spatial light system and generate room information from the sensor data. The sensors 3136 may be, but are not necessarily coupled to the flex strips 3130. The room information may be stored to memory 3194. The controller 3090 may drive or control the projection units 3010 on the flex strips 3130 to emit light into a room according to image content and the room information generated from the sensor data. The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents. The room information may, for example, be used to determine direction and depths at which "pixels" projected by the projection units 3110 are to be focused, objects or surfaces to be illuminated or not illuminated, and so on.

In some embodiments, a spatial light system may include at least one camera for tracking objects or persons within a room. In some embodiments, a camera may be implemented as a sensor module 3136 that plugs into a flex strip 3130. Alternatively, in some embodiments, at least one of the projection units 3110 may include an embedded camera. In some embodiments, the embedded camera may be confocal with the light projection mechanism of the projection unit 3110; that is, the camera uses the same optical path as the light projection mechanism of the projection unit 3110 to capture images or video of a portion of a room. Tracking an object or person may, for example, allow the spatial light system to project light with respect to a moving object or person to augment that object or person, for example to project light in front of a moving toy car to provide the appearance of headlights of the car, or to "spotlight" a moving person in a room.

Image content to be projected by the spatial light system may be obtained from an external device, for example via a wireless connection through interface 3198, or alternatively may be generated by controller 3190 based on image information stored locally in memory 3194.

In some embodiments, controller 3190 may generate or render video or images based on the room information and image content that may be projected by projection units 3110 coupled to the controller 3190 via flex strips 3130 connected to the controller 3190 via serial interface 3199. In some embodiments, controller 3190 may also include memory 3194 that, for example, stores software that is executable by the controller 310, data that may be used by the controller 3190 including but not limited to room information, and/or that includes buffer(s) for sensor data and image or video content. In some embodiments, controller 3190 may also include one or more interfaces 3198 that may facilitate communication with an external device via a wired or wireless connection. In some embodiments, the external device may send image content (e.g., video) to be rendered and displayed by the spatial light system to the controller 3190 via interface 3198, and may also send signals to control operations of the spatial light system to the controller 3190 via interface 3198. The external device may be or may include any type of computing system or computing device, such as a desktop computer, notebook or laptop computer, pad or tablet device, smartphone, hand-held computing device, game controller, game system, AR/VR device such as a head-mounted device, smart device such as a smart television, and so on.

In some embodiments the individual projection units 3110 may be controlled by controller 3190 via a serial communications protocol through interface 3199 and flex strip(s) 3130. In addition, data from sensors 3136 may be obtained via the serial communications protocol through interface 3199 and flex strip(s) 3130. In some embodiments, the serial communications protocol may be SDI (serial digital interface). However, other communications protocols may be used. In some embodiments, SDI may provide a 30 MHz rate at 16 bit color depth, and may maintain a 60 Hz per second frame rate.

In various embodiments, controller 3190 may be a uniprocessor system including one processor 3192, or a multiprocessor system including several processors 3192 (e.g., two, four, eight, or another suitable number). Controller 3190 may include central processing units (CPUs) that implement any suitable instruction set architecture, and may execute instructions defined in that instruction set architecture. For example, in various embodiments controller 3190 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 3190 may employ any microarchitecture, including scalar, superscalar, pipelined, superpipelined, out of order, in order, speculative, non-speculative, etc., or combinations thereof. Controller 3190 may include circuitry to implement microcoding techniques. Controller 3190 may include one or more processing cores that each execute instructions. Controller 3190 may include one or more levels of caches, which may employ any size and any configuration (set associative, direct mapped, etc.). In some embodiments, controller 3190 may include at least one graphics processing unit (GPU), which may include any suitable graphics processing circuitry. Generally, a GPU may render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 3190 may include one or more other components for processing and rendering video and/or images, for example image signal processors (ISPs), coder/decoders (codecs), etc.

Memory 3194 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SINMs), dual inline memory modules (DIMMs), etc. Alternatively, the devices may be mounted with an integrated circuit implementing system in a chip-on-chip configuration, a package-on-package configuration, or a multi-chip module configuration.

Figure 12:
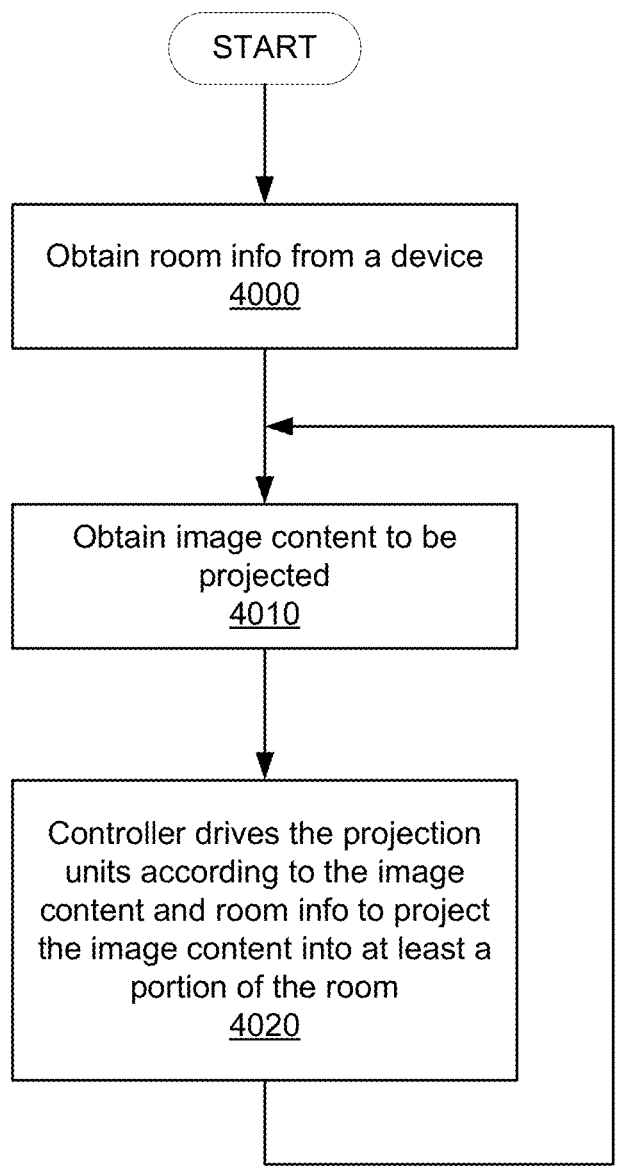
FIG. 12 is a high-level flowchart of a method of operation for an example spatial light system that receives room information from an external device, according to some embodiments.

FIG. 12 is a high-level flowchart of a method of operation for an example spatial light system that receives room information from an external device, according to some embodiments. As indicated at 4000, the spatial light system may obtain room information from a device, for example via a wireless connection. The device may, for example, be a smartphone, tablet or pad device, laptops or other computer system, AR/VR system, or other smart device such as a television. The room information may include, but is not limited to, depth information for surfaces in the room, lighting information for the room, specular information for surfaces or objects in the room, location and identification information for objects in the room, location, motion, and orientation information for persons in the room, or in general any mapping information that can be obtained for a room and its current contents.

As indicated at 4010, the spatial light system may obtain image content to be projected into the room. The image content may be obtained from an external device, for example via a wireless connection, or alternatively may be generated based on image information stored locally in memory of the system.

As indicated at 4020, a spatial light system controller may drive the projection units according to the image content and room information to project the image content into at least a portion of the room. The system may, for example, project illuminating light, AR imagery, patterns, or other image content onto the floor, walls, and/or ceiling of a room. However, the system may also intelligently light or augment particular objects found within a room, and/or intelligently not illuminate certain surfaces or objects such as windows or television screens, or persons, within a room, based on the room information obtained from an external device.

In some embodiments, to drive the projection units, the spatial light system controller generates or receives video signals (e.g., from an external device such as an AR/VR device, pad or tablet device, or smartphone) and processes the signals into separate video drives for each projection units so that the final image(s) projected by all the projection units is correctly stitched and continuous. The controller then provides the correct pulse width modulation to each LED pixel of each projection unit so that the correct light output is achieved to project the imagery.

As indicated by the arrow returning from 4020 to 4010, the method may continue to obtain or generate image content and project the image content while the system is in use. While not specifically shown, additional or updated room information may be obtained from an external device while the system is in use; the additional or updated information may be used to adjust projection of the image content into the room.

Figure 13:
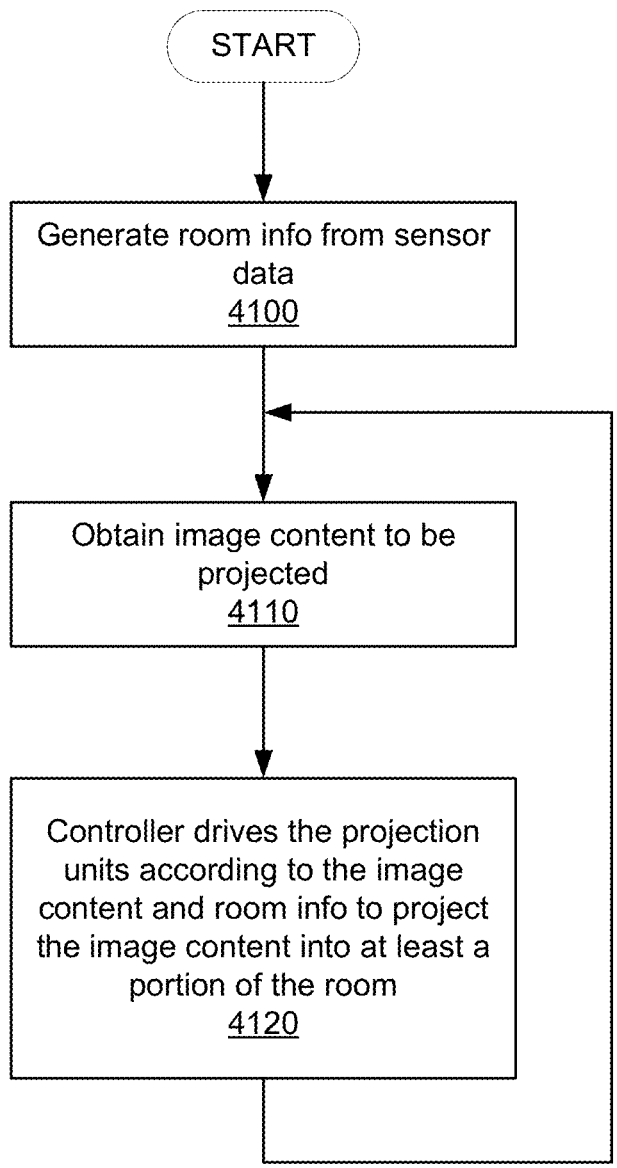
FIG. 13 is a high-level flowchart of a method of operation for an example spatial light system that includes sensors that collect data used to generate room information, according to some embodiments.

FIG. 13 is a high-level flowchart of a method of operation for an example spatial light system that includes sensors that collect data used to generate room information, according to some embodiments. As indicated at 4100, the spatial light system may generate room information from data collected by one or more sensors integrated in the spatial light system. For example, the sensors may be modules that connect to the flex strips to which the projection units are also connected. The sensors may actively collect data about the room that can be used to generate the room information (e.g., surface depths, lighting, specular surfaces, motion, object detection and identification, etc.) and provide the collected data to a controller of the spatial light system. For example, one or more sensors may collect lighting information for existing artificial and natural light sources in a room, such as lamps, televisions, and windows.

As indicated at 4110, the spatial light system may obtain image content to be projected into the room. The image content may be obtained from an external device, for example via a wireless connection, or alternatively may be generated based on image information stored locally in memory of the system.

As indicated at 4120, a spatial light system controller may drive the projection units according to the image content and room information to project the image content into at least a portion of the room. The system may, for example, project illuminating light, AR imagery, patterns, or other image content onto the floor, walls, and/or ceiling of a room. However, the system may also intelligently light or augment particular objects found within a room, and/or intelligently not illuminate certain surfaces or objects such as windows or television screens, or persons, within a room, based on the room information obtained from an external device.

In some embodiments, to drive the projection units, the spatial light system controller generates or receives video signals (e.g., from an external device such as an AR/VR device, pad or tablet device, or smartphone) and processes the signals into separate video drives for each projection units so that the final image(s) projected by all the projection units is correctly stitched and continuous. The controller then provides the correct pulse width modulation to each LED pixel of each projection unit so that the correct light output is achieved to project the imagery.

As indicated by the arrow returning from 4120 to 4110, the method may continue to obtain or generate image content and project the image content while the system is in use. While not specifically shown, additional data may be obtained from the sensors while the system is in use; the additional or data may be used to adjust the room information and thus the projection of the image content into the room.

Figure 14:
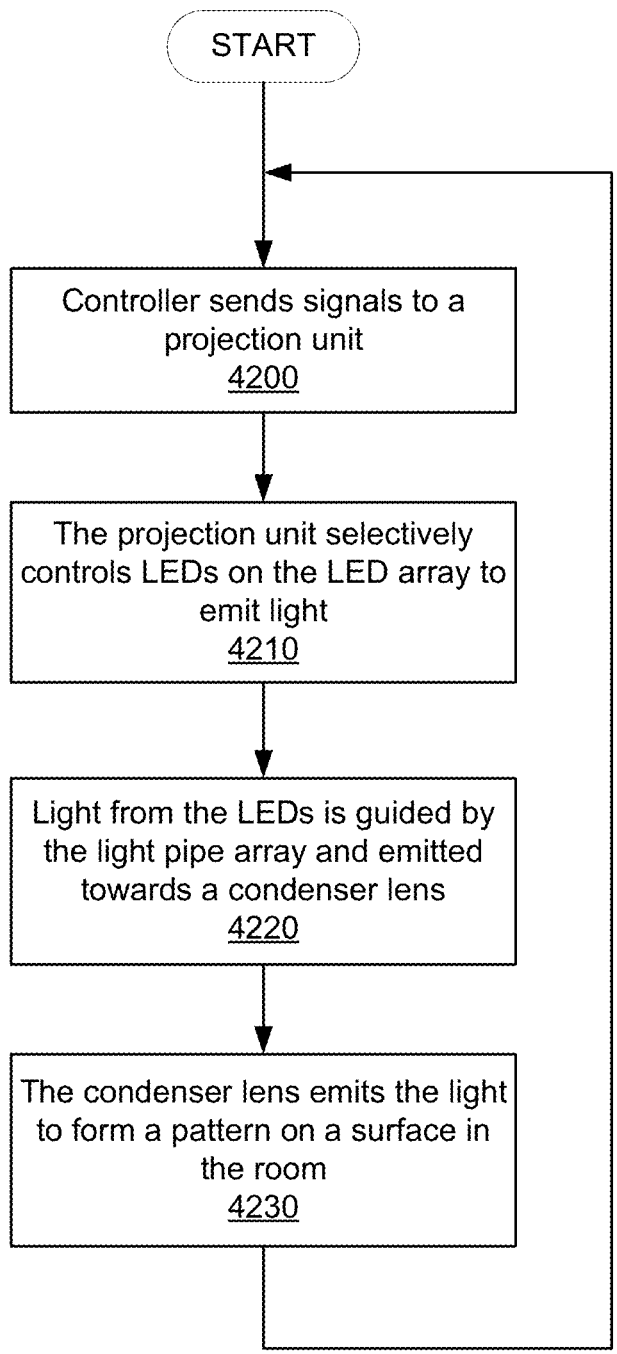
FIG. 14 is a high-level flowchart of a method of operation for an example projection unit, according to some embodiments.

FIG. 14 is a high-level flowchart of a method of operation for an example projection unit, according to some embodiments. As indicated at 4200, the controller sends signals to a projection unit. As indicated at 4210, the projection unit selectively controls LEDs on the LED array to emit light. As indicated at 4220, light from the LEDs is guided by the light pipe array and emitted towards a condenser lens. As indicated at 4230, the condenser lens emits the light to form a pattern on one or more surfaces in the room. Note that the controller may simultaneously drive multiple projection units to project image content onto surface(s) in the room. The light from two or more projection units may overlap to form "pixels" on the surface; the pixels represent the image content that is being projected.

Figure 15:
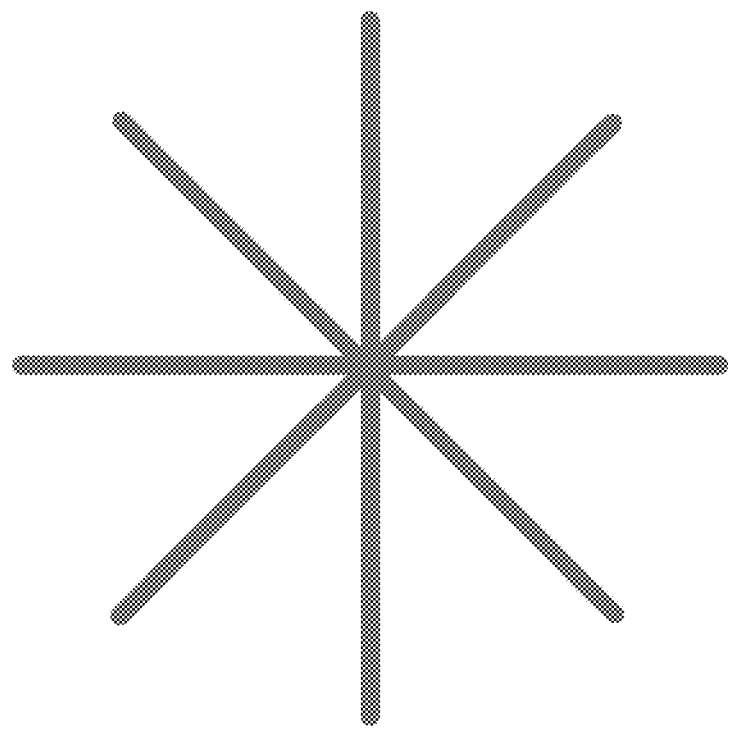
FIG. 15 illustrates different configurations for flexible strips, according to some embodiments.
Figure 15:

FIG. 15 illustrates different configurations for flexible strips, according to some embodiments. FIG. 15 (A) shows a flexible strip configured as a single linear strip that can be applied to the surface of a shape. FIG. 15 (B) shows a flexible strip configured in an "octopus" configuration that includes N strips extending from a central hum. FIG. 15 (C) shows a flexible strip configured as a spiral. Note that these configurations are given as examples, and are not intended to be limiting, and other configurations are possible.

While embodiments are generally described in which the flexible strips are attached to a shaped object such as a sphere or cylinder to form a spatial light system, the flexible strips may be attached to other objects, or to walls, ceilings, floors, or other surfaces, within a room to provide custom lighting configurations with similar capabilities as the spatial light system configurations described herein.

Color Display Content

In some embodiments, color display content can be provided by the projector(s) in the AR light systems described herein by using an array of discrete red, green, and blue conventional LED sub-pixels. In some embodiments, a tunable white output may be achieved with selected color temperature conventional white LEDs, selectively driven within the LED arrays. In some embodiments, arrays of monolithic Indium Gallium Nitride (InGaN) tunable color LEDs can be used, for example as described in: Chen, J. C., et al. "Growth of monolithic full-color light-emitting diode and its applications." *Gallium Nitride Materials and Devices XIV*. Vol. 10918. International Society for Optics and Photonics, 2019. In some embodiments, LEDs containing three different sets of quantum wells separated with intermediate carrier blocking layers may be used. In some embodiments, pulsed drive current containing different current amplitudes and widths, each creating a separate color, may be used. Alternatively a white output with tunable color temperature can be achieved.

In some embodiments, white light may be created using a UV source (often around 400 nm) which is then excited a phosphor that is deposited on the device window. The UV illumination is unconverted by the excited phosphor to create a broad spectrum of illumination that results in white light output. In some embodiments, the white light may be "tuned" by changing the phosphor in real-time (e.g., a tilting disc, color wheel, or other combination of beam-steering through appropriate filtering) to create slightly shifted white balance. In some embodiments, RGB light sources can be added in together and "mixed" to enhance or further shift the white spectrum being generated.

Spatial Light System Use Cases and Applications

The following describes several example use cases and applications for embodiments of a spatial light system as described herein. A spatial light system may be a device that lies somewhere between a projector and a light bulb. A spatial light system may be as bright as a light bulb, and may generate as high-quality light as a light bulb, but is higher resolution than a light bulb. However, a spatial light system may not be as high resolution as a conventional projector. Following from this, a spatial light system allows a lot of interesting use cases and applications.

In some embodiments, a spatial light system may be configured as a sphere that has a number of emitting pixels; each dot on the sphere corresponds to an LED that is projected onto the wall; the dots may be blended to generate imagery, for example sky and cloud images that an occupant of a room sees in the background, projected onto surfaces of the room by the spatial light system. The projected pixels on a wall may look fairly big and the imagery may be fairly low resolution when compared to pixels and imagery projected by a conventional projector.

Embodiments of a spatial light system may also rely on understanding the room that the system is in. Using room information obtained from an external source and/or from sensors of the system, light can be selectively projected or not projected onto particular surfaces or objects in the room. The room information may also be used to modulate brightness to avoid "hotspots" or similar undesirable lighting.

Embodiments of a spatial light system may be used to illuminate surfaces, floors, ceilings, or walls. Embodiments of a spatial light system may be used to create a spotlight that moves within a room without moving parts by turning on and off pixels. Embodiments of a spatial light system may be used to create architectural lighting, to highlight photographs or paintings, or to create accent lighting with different color temperatures, all without changing any hardware in the room.

Embodiments of a spatial light system may be used to create effects such rain, tree shadows, etc. that bring outside elements into the room, or to create caustics and abstract effects within a room or portion of a room, Embodiments of a spatial light system also be used to interact with other devices in the room. Embodiments of a spatial light system may be used to expand or extend the content of devices, for example by expending the content of a television into the entire room.

In some embodiments, a spatial light system may emit spatial light in combination with other devices, for example to provide the expansion of television content. For example, embodiments of a spatial light system may generate content that can break out of a television; for example, a spatial light system may generate a Peter Pan-like shadow that walks around on the walls or ceiling of the room.

In some embodiments, the system may emit light to provide a low resolution version of a virtual environment that a person in the room is experiencing in virtual reality (e.g., using a headset or head-mounted device (HMD)) to give context to other people in the room without virtual reality headsets. In some embodiments, the system may emit light to complement a mixed reality environment being experienced by a person using an augmented reality headset by using lighting to improve contrast and colors viewed in the headset.

Embodiments of a spatial light system may create a virtual portal window. For example, for a person working from home, a virtual portal window may be generated to make a room at home feel more like an open office when working, or to provide a virtual window in an enclosed room.

Embodiments of a spatial light system may be controlled from an external device such as a smartphone, pad or tablet using touch, keystrokes, and/or voice commands. Using sensor technology and the ability to spotlight locations within a room, a voice command could be given requesting the location of an item such as keys; in response, the spatial light system could "shine a spotlight" on the keys.

Embodiments of a spatial light system may adjust the rendering of imagery within a room based on a detected point of view of a person within the room. Embodiments of a spatial light system may also affect the projected light based on the presence and movement of a person or persons within a room, for example to track and spotlight a moving person, or to not emit light towards the face of a person detected within the room.

Embodiments of a spatial light system may be used with a camera to improve photography by using emitted light to create bounced light, or different studio effects.

Embodiments of a spatial light system may be used to create cool or warm accent lighting within a room.

Most of these examples rely on embodiments of a spatial light system that includes projection units with multiple LEDs on a surface of a sphere. The projection unit technology may also be used to create a light bulb that projects imagery onto a localized object or surface. A light or lamp in this configuration may have the same or similar capabilities of understanding the room environment, and may provide a low resolution, bright projector based on LEDs that can do similar things as a sphere-shaped spatial light system.

Two or more spatial light systems may be used together in a room, and may interact with each other, either by direct communication via a wired or wireless connection or through an external device. Using room information obtained by spatial light system sensors or from an external device, each spatial light system may know where the other spatial light system(s) are located in the room, and may work together to complement each other, and to generate imagery from the combined light of the spatial light systems. In some embodiments, two or more spatial light systems may work in synchronization with each other, aware of their respective locations, orientations, and light output through wired or wireless communications channel(s), (e.g., ultra-wideband (UWB), cameras, sensors, pulsed visible or non-visible light signals, etc.) or through external device calibration, for example to create more room filling experiences, to avoid issues such as shadows, and/or to increase overall light output.

In addition to sphere and light bulb configurations, embodiments may be formed in other shapes, for example as cylinders or disks as described herein.

FIGS. 16 through 23 show different use cases and applications for a spatial light system, according to some embodiments.

Figure 16:
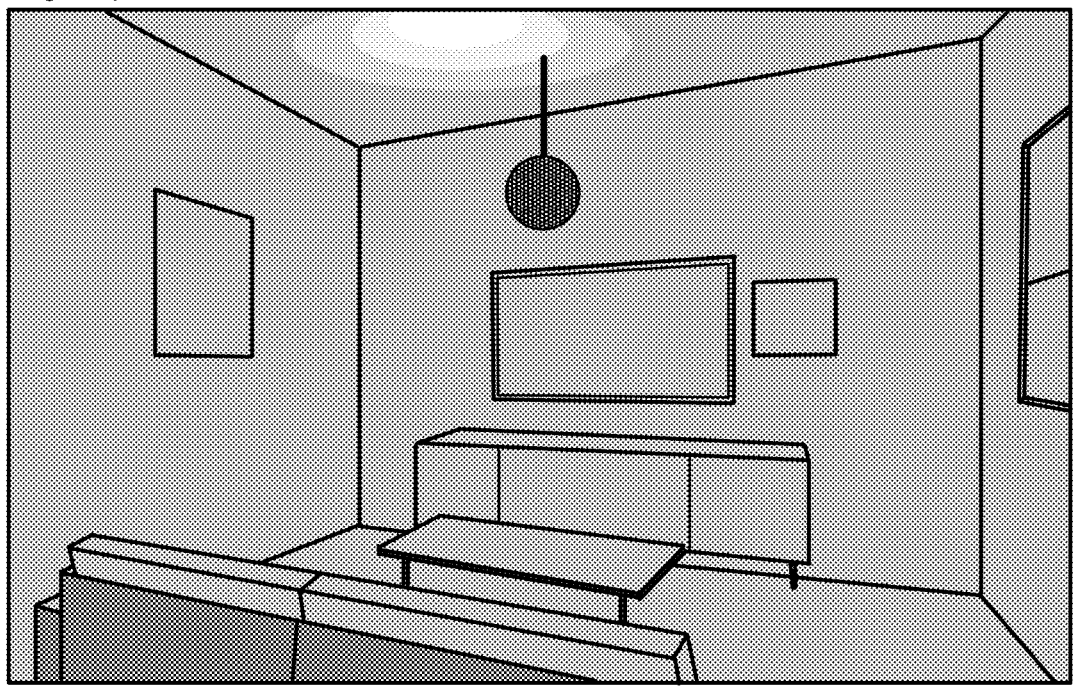
FIGS. 16 through 23 show different use cases and applications for a spatial light system, according to some embodiments.

FIG. 16 shows a use case where a spatial light system is used to illuminate a room. Each "dot" on the wall is a pixel projected by one or more LEDs of the spatial light system. The light may be white light, or may be mixed/color light.

Figure 17:
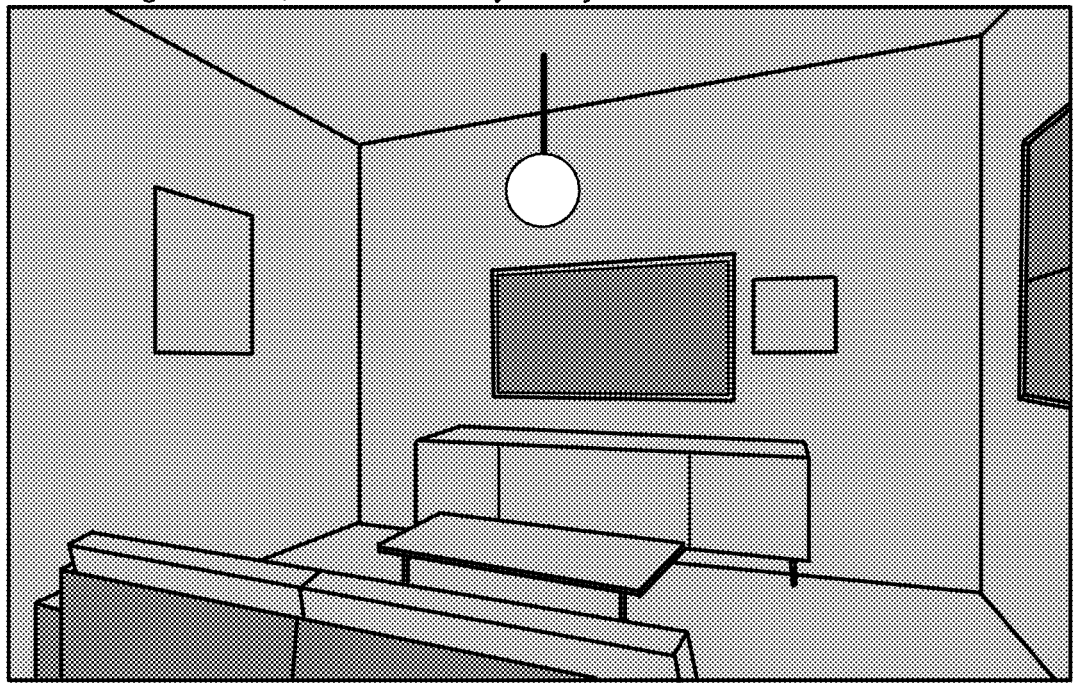

FIG. 17 shows a use case where a spatial light system is used to selectively illuminate a room so that reflective surfaces such as televisions and windows are not illuminated. The system may also not directly illuminate the faces of person(s) in the room.

Figure 18:
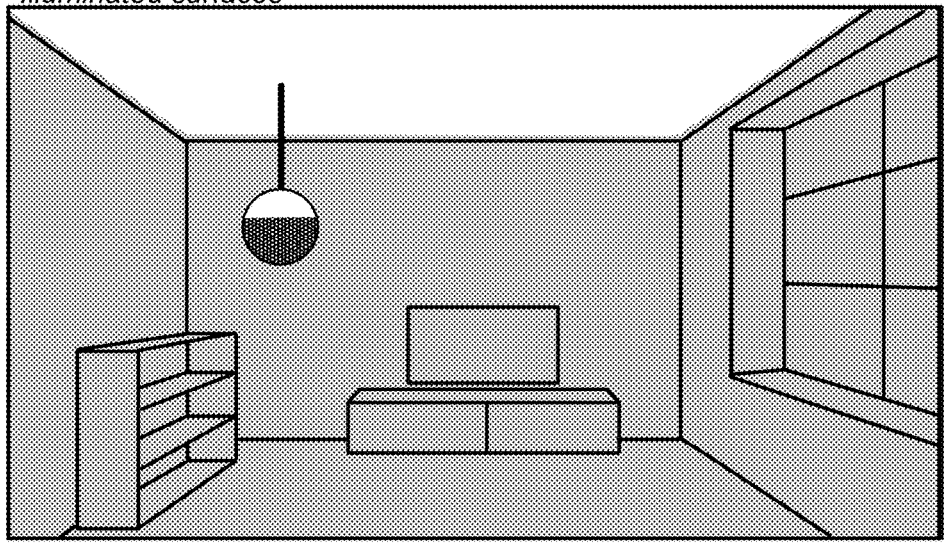
Figure 19:
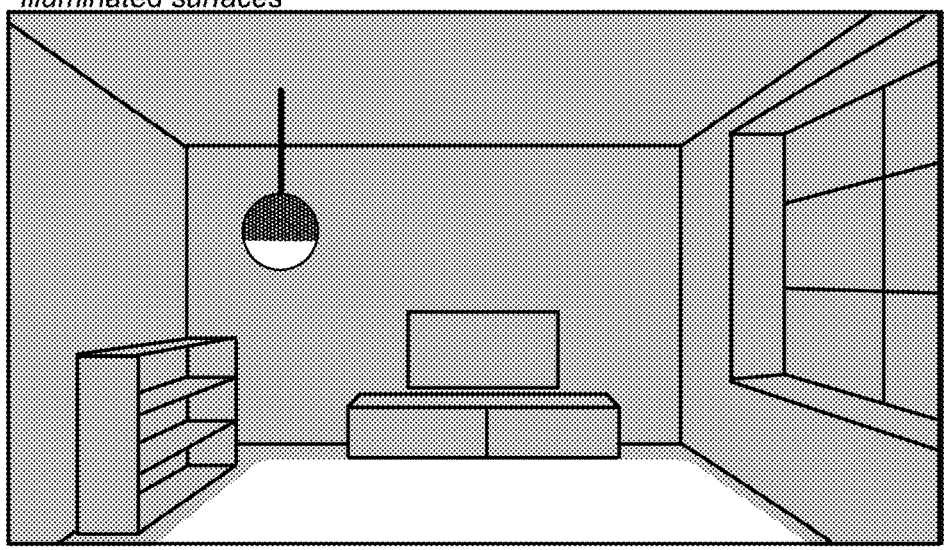
Figure 20:
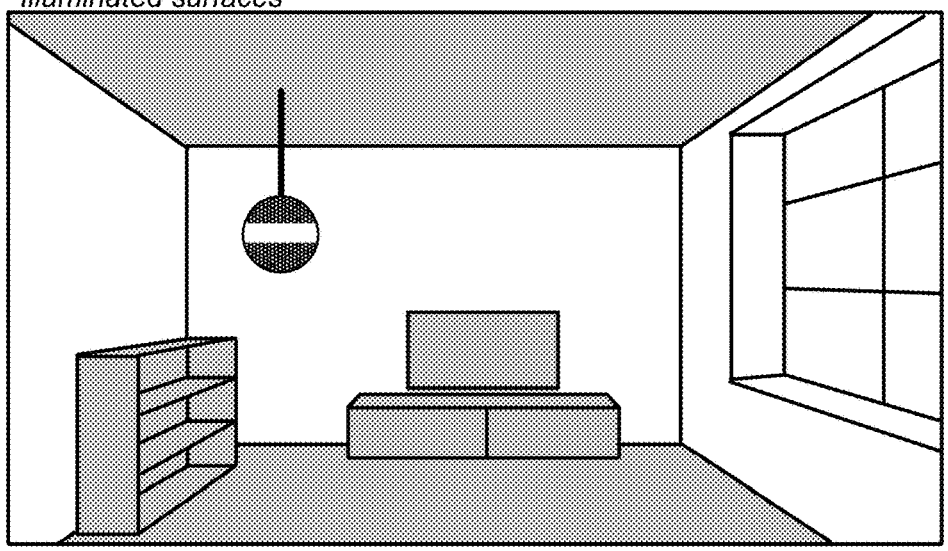

FIGS. 18, 19 and 20 show a use case where a spatial light system is used to selectively illuminate surfaces in a room. In FIG. 18, the ceiling is illuminated. In FIG. 19, the floor is illuminated. In FIG. 20, the walls are illuminated.

Figure 21:
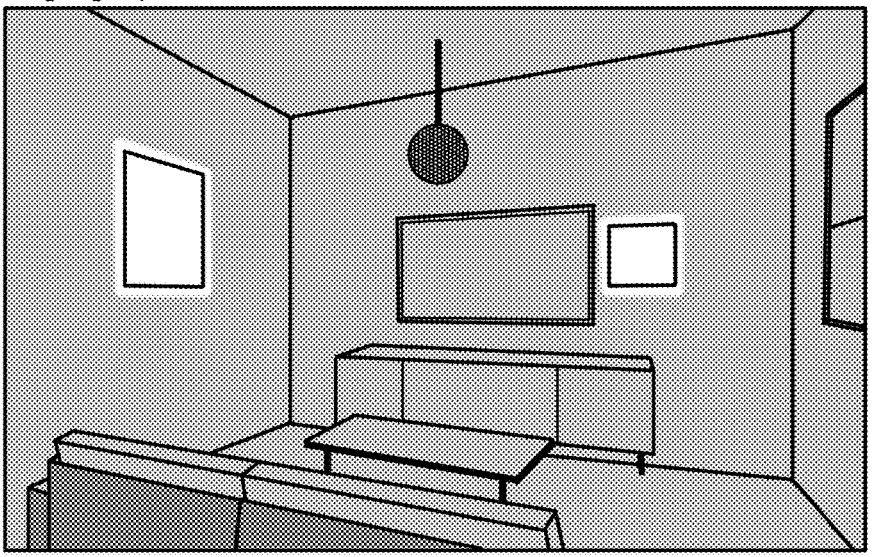

FIG. 21 shows a use case where a spatial light system is used to selectively illuminate particular objects in a room, in this example one or more photographs or other artwork on the walls.

Figure 22:
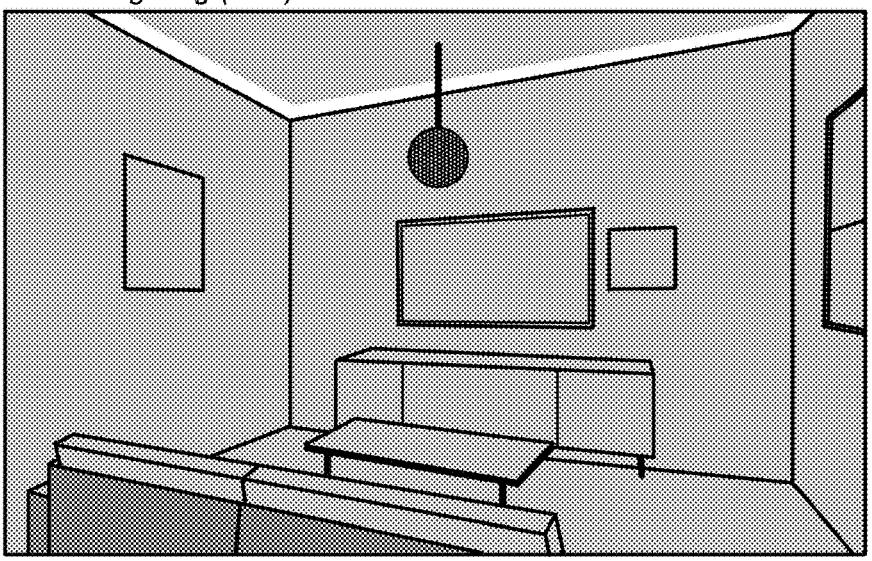

FIG. 22 shows a use case where a spatial light system is used to provide accent lighting within a room.

Figure 23:
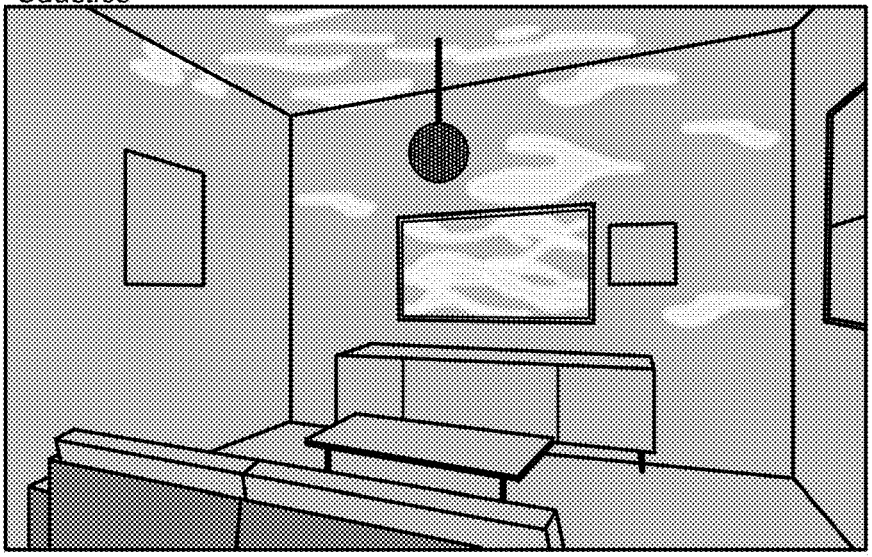

FIG. 23 shows a use case where a spatial light system is used to project caustics or other graphical content on surfaces in a room. The projected imagery may be still or may move. Other similar effects may include, but are not limited to the shadows of trees or soft rain Extended Reality A real environment refers to an environment that a person can perceive (e.g. see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

There are many types of devices that allow a user to experience the various forms of XR. Examples include HMDs, heads up displays (HUDs), projector-based systems, smart windows, tablets, desktop or laptop computers, smart watches, earbuds/headphones, controllers that may include haptic devices, and many others. As mentioned above, an HMD, or any of the other devices listed above may include opaque displays (e.g. liquid crystal displays (LCDs), organic light emitting diode (OLED) displays or micro-LED displays) or see through displays. A see through display can have a medium through which light is directed to a user's eyes. The medium can include one or more of a waveguide, hologram medium, optical combiner, optical reflector and other optical components. An image can be generated and propagated through the medium using a display source such as OLEDs, micro-LEDs, liquid crystal on silicon (LCOS), a light scanner, digital light projection (DLP).

Devices for XR may also include audio output devices such as speakers to present audio (including spatial audio) to users, haptics devices to stimulate the user's sense of touch, and other devices to stimulate any of the user's senses. Additionally, the device may include numerous sensors, including cameras, microphones, depth sensors, eye tracking sensors, environmental sensors, input sensors, and other sensors to allow the device to understand the user and the real environment.

The following clauses describe various examples embodiments consistent with the description provided herein.

Clause 1. A projection unit, comprising:
an LED array comprising a plurality of individually addressable light-emitting diodes (LEDs);
a light pipe array comprising a plurality of light pipes; and
a condenser lens;
wherein the LEDs are configured to selectively emit light beams into the light pipes under control of a controller;
wherein the light pipes are configured to guide the light beams emitted by the LEDs and emit the guided light beams towards the condenser lens; and
wherein the condenser lens is configured to affect the emitted light beams received from the light pipes and project the light beams onto a surface;
wherein each projected light beam forms a pixel or a portion of a pixel of an image on the surface.

Clause 2. The projection unit as recited in clause 1, wherein the LED array includes one or more white light emitting LEDs and one or more color light emitting LEDs.

Clause 3. The projection unit as recited in clause 1, wherein each light pipe corresponds to and receives light emitted from one and only one of the LEDs.

Clause 4. The projection unit as recited in clause 1, wherein the LED array is coupled to a printed circuit board (PCB) base.

Clause 5. The projection unit as recited in clause 4, wherein the condenser lens and light pipe array are enclosed in and mounted on the PCB base via a frame.

Clause 6. The projection unit as recited in clause 4, wherein the PCB base includes one or more connectors for coupling to a signal source.

Clause 7. The projection unit as recited in clause 6, wherein the signal source is a flexible strip that includes one or more connectors for receiving one or more projection units.

Clause 8. The projection unit as recited in clause 7, wherein the flexible strip is configured to couple to the controller.

Clause 9. The projection unit as recited in clause 8, wherein the flexible strip is further configured to couple to another flexible strip.

Clause 10. The projection unit as recited in clause 6, wherein the signal source is a serial communications protocol signal source.

Clause 11. The projection unit as recited in clause 10, wherein the serial communications protocol is an SDI (serial digital interface) protocol.

Clause 12. The projection unit as recited in clause 6, wherein the flexible strip is configured to be conformed to a curved or flat surface of an object.

Clause 13. The projection unit as recited in clause 1, wherein the condenser lens is a ball lens.

Clause 14. A spatial light system, comprising:
a controller comprising one or more processors; and
two or more projection units, each projection unit comprising:
an LED array comprising a plurality of individually addressable light-emitting diodes (LEDs);
a light pipe array comprising a plurality of light pipes; and
a condenser lens;
wherein the controller is configured to direct the LEDs in the two or more projection units to selectively emit light beams into the light pipes;
wherein the light pipes are configured to guide the light beams emitted by the LEDs and emit the guided light beams towards the condenser lenses; and wherein the condenser lenses are configured to affect the emitted light beams received from the light pipes and project the light beams onto one or more surfaces in a room;

wherein each projected light beam forms a pixel or a portion of a pixel of image content on a surface within the room, and wherein the combined pixels form image content on the one or more surfaces in the room.

Clause 15. The spatial light system as recited in clause 14, wherein each LED array includes one or more white light emitting LEDs and one or more color light emitting LEDs, and wherein each light pipe corresponds to and receives light emitted from one and only one of the LEDs.

Clause 16. The spatial light system as recited in clause 14, wherein each LED array is coupled to a printed circuit board (PCB) base, wherein the condenser lens and light pipe array are enclosed in and mounted on the PCB base via a frame, and wherein the PCB base includes one or more connectors for coupling to a signal source coupled to the controller.

Clause 17. The spatial light system as recited in clause 16, wherein the signal source is a flexible strip that includes two or more connectors for receiving the two or more projection units, and wherein the flexible strip is configured to couple to the controller.

Clause 18. The spatial light system as recited in clause 17, wherein the flexible strip is further configured to couple to another flexible strip.

Clause 19. The spatial light system as recited in clause 17, wherein the signal source is a serial communications protocol signal source.

Clause 20. The spatial light system as recited in clause 19, wherein the serial communications protocol is an SDI (serial digital interface) protocol.

Clause 21. The spatial light system as recited in clause 17, wherein the flexible strip is configured to be conformed to a curved or flat surface of the spatial light system.

Clause 22. The spatial light system as recited in clause 14, wherein the spatial light system is formed in a shape with the two or more projection units attached to at least a portion of an exterior surface of the spatial light system so that light from the projection units is projected outwards into the room, into a portion of the room, or onto one or more objects or surfaces within the room.

Clause 23. The spatial light system as recited in clause 22, wherein the shape of the spatial light system is one of a bulb in a lamp configuration, a disk in a disk configuration, a cylinder in a cylindrical configuration, and a sphere in a spherical configuration.

Clause 24. The spatial light system as recited in clause 14, further comprising one or more sensors configured to collect data about the room, wherein the controller is configured to process the collected data to detect objects and surfaces within the room, determine depth of the objects or surfaces within the room, and detect motion within the room.

Clause 25. The spatial light system as recited in clause 24, wherein the controller is further configured to use information determined from the sensor data to selectively drive particular projection units and particular LEDs within the projection units to selectively illuminate or not illuminate detected objects or surfaces within the room.

Clause 26. The spatial light system as recited in clause 14, wherein the controller is configured to obtain room information from an external source, wherein the room information indicates objects and surfaces within the room, depth of the objects or surfaces within the room, and motion within the room, wherein the controller is further configured to use the room information to selectively drive particular projection units and particular LEDs within the projection units to selectively illuminate or not illuminate detected objects or surfaces within the room.

Clause 27. The spatial light system as recited in clause 14, further comprising wireless technology that enables wireless communications between the controller of the spatial light system and one or more other devices.

Clause 28. The spatial light system as recited in clause 14, wherein the controller is further configured to cause at least one emitted light beam to pulse at a frequency, wherein the at least on emitted light beam when pulsed conveys information about the spatial light system to one or more other devices.

Clause 29. The spatial light system as recited in clause 14, wherein the spatial light system includes at least one sensor configured to receive light emitted from another spatial light system, and wherein the controller is further configured to obtain information about the other spatial light system from the received light.

Clause 30. The spatial light system as recited in clause 14, wherein at least a portion of the light beams from two or more adjacent projection units overlap, wherein the light beams from LEDs in the two or more adjacent projection units combine to form pixels of the image content on the surfaces within the room.

Clause 31. The spatial light system as recited in clause 14, wherein the image content formed on the one or more surfaces in the room by the spatial light system is one of augmented reality (AR) content, still or moving patterns, illuminating light for one or more objects or surfaces within the room.

Clause 32. The spatial light system as recited in clause 14, wherein the one or more surfaces include one or more of walls, ceiling, and floor of the room.

Clause 33. The spatial light system as recited in clause 14, wherein the one or more surfaces include surfaces of one or more objects within the room.

Clause 34. A method, comprising:
performing, by a controller of a spatial light system comprising one or more processors:
obtaining room information for a room in which the spatial light system is located;
obtaining image content to be projected into the room; and
directing two or more projection units of the spatial light system according to the image content and the room information to project the image content into at least a portion of the room.

Clause 35. The method as recited in clause 34, wherein the room information includes one or more of depth information for surfaces in a room, lighting information for the room, specular information for surfaces or objects in the room, location and identification information for objects in the room, and location, motion, and orientation information for persons in the room.

Clause 36. The method as recited in clause 34, wherein the image content is obtained from an external device or generated based on information stored in local memory of the spatial light system.

Clause 37. The method as recited in clause 34, wherein the room information is obtained from an external device.

Clause 38. The method as recited in clause 34, wherein the room information is generated from data collected by one or more sensors of the spatial light system.

Clause 39. The method as recited in clause 34, wherein the two or more projection units each comprise:

an LED array comprising a plurality of individually addressable light-emitting diodes (LEDs);
light collection or light shaping optical elements; and
a condenser lens.

Clause 40. The method as recited in clause 39, wherein the light collection or light shaping optical elements include a light pipe array comprising a plurality of light pipes.

Clause 41. The method as recited in clause 40, wherein directing the two or more projection units of the spatial light system according to the image content and the room information to project the image content into at least a portion of the room comprises: directing the LEDs in the two or more projection units to selectively emit light beams into the light pipes;
guiding, by the light pipes, the light beams emitted by the LEDs and emitting the guided light beams towards the condenser lenses; and
affecting, by the condenser lens, the emitted light beams received from the light pipes and projecting the light beams onto one or more surfaces in a room;
wherein each projected light beam forms a pixel or a portion of a pixel of image content on a surface within the room, and wherein the combined pixels form image content on the one or more surfaces in the room.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A projection unit, comprising:
an LED array comprising a plurality of individually addressable light-emitting diodes (LEDs);
a light pipe array comprising a plurality of light pipes; and
a condenser lens;
wherein the LEDs are individually controlled by a controller to selectively emit light beams into the light pipes, wherein each light beam forms a respective pixel or a portion of a respective pixel of an image under control of the controller, wherein the controller is configured to selectively drive individual ones of the LEDs to (a) turn on or off individual ones of the LEDs, (b) change an intensity of individual ones of the LEDs, and (c) change depth of focus of individual ones of the LEDs;
wherein the light pipes are configured to guide the light beams emitted by the LEDs and emit the guided light beams towards the condenser lens; and
wherein the condenser lens is configured to affect the emitted light beams received from the light pipes and project the light beams onto a surface;
wherein each projected light beam forms the respective pixel or the portion of the respective pixel of the image on the surface.

2. The projection unit as recited in claim 1, wherein the LED array includes one or more white light emitting LEDs and one or more color light emitting LEDs.

3. The projection unit as recited in claim 1, wherein each light pipe corresponds to and receives light emitted from one and only one of the LEDs.

4. The projection unit as recited in claim 1, wherein the LED array is coupled to a printed circuit board (PCB) base including one or more connectors for coupling to a flexible strip, the projection unit further comprising the flexible strip, wherein the flexible strip includes one or more connectors for receiving one or more projection units, and the flexible strip is configured to couple to the controller.

5. The projection unit as recited in claim 4, wherein the condenser lens and light pipe array are enclosed in and mounted on the PCB base via a frame.

6. The projection unit as recited in claim 4, wherein a serial communications protocol signal source is provided via the flexible strip.

7. The projection unit as recited in claim 1, wherein the condenser lens is a ball lens.

8. A spatial light system, comprising:
a controller comprising one or more processors; and
two or more projection units, each projection unit comprising:
an LED array comprising a plurality of individually addressable light-emitting diodes (LEDs);
a light pipe array comprising a plurality of light pipes; and
a condenser lens;
wherein the controller is configured to direct individual ones of the LEDs in the two or more projection units to selectively emit light beams into the light pipes, wherein each light beam forms a respective pixel or a portion of a respective pixel of an image content under control of the controller, wherein the controller is configured to selectively drive individual ones of the LEDs to (a) turn on or off individual ones of the LEDs, (b) change an intensity of individual ones of the LEDs, and (c) change depth of focus of individual ones of the LEDs;
wherein the light pipes are configured to guide the light beams emitted by the LEDs and emit the guided light beams towards the condenser lenses;
wherein the condenser lenses are configured to affect the emitted light beams received from the light pipes and project the light beams onto one or more surfaces in a room; and
wherein each projected light beam forms the respective pixel or the portion of the respective pixel of the image content on a surface within the room.

9. The spatial light system as recited in claim 8, wherein the spatial light system is formed in a shape with the two or more projection units attached to at least a portion of an exterior surface of the spatial light system so that light from the projection units is projected outwards into the room, into a portion of the room, or onto one or more objects or surfaces within the room.

10. The spatial light system as recited in claim 9, wherein the shape of the spatial light system is one of a bulb in a lamp configuration, a disk in a disk configuration, a cylinder in a cylindrical configuration, and a sphere in a spherical configuration.

11. The spatial light system as recited in claim 8, further comprising:
one or more sensors configured to collect data about the room;
wherein the controller is configured to:
process the collected data to detect objects and surfaces within the room, determine depth of the objects or surfaces within the room, and detect motion within the room; and
use information determined from the sensor data to selectively drive particular projection units and particular LEDs within the projection units to selectively illuminate or not illuminate detected objects or surfaces within the room.

12. The spatial light system as recited in claim 8, wherein the controller is configured to obtain room information from an external source, wherein the room information indicates objects and surfaces within the room, depth of the objects or surfaces within the room, and motion within the room, wherein the controller is further configured to use the room information to selectively drive particular projection units and particular LEDs within the projection units to selectively illuminate or not illuminate detected objects or surfaces within the room.

13. The spatial light system as recited in claim 8, wherein the controller is further configured to cause at least one emitted light beam to pulse at a frequency, wherein the at least on emitted light beam when pulsed conveys information about the spatial light system to one or more other devices.

14. The spatial light system as recited in claim 8, wherein the spatial light system includes at least one sensor configured to receive light emitted from another spatial light system, and wherein the controller is further configured to obtain information about the other spatial light system from the received light.

15. The spatial light system as recited in claim 8, wherein at least a portion of the light beams from two or more adjacent projection units overlap, wherein the light beams from LEDs in the two or more adjacent projection units are combined to form the respective pixels of the image content on the surfaces within the room.

16. The spatial light system as recited in claim 8, wherein the image content formed on the one or more surfaces in the room by the spatial light system is one of augmented reality (AR) content, still or moving patterns, or illuminating light for one or more objects or surfaces within the room.

17. A method, comprising:
performing, by a controller of a spatial light system comprising one or more processors:
obtaining room information for a room in which the spatial light system is located;
obtaining image content to be projected into the room; and
directing individual light-emitting diodes (LEDs) of two or more projection units of the spatial light system according to the image content and the room information to project the image content into at least a portion of the room;
wherein the controller is configured to selectively drive individual ones of the LEDs to (a) turn on or off individual ones of the LEDs, (b) change an intensity of individual ones of the LEDs, and (c) change depth of focus of individual ones of the LEDs;
wherein individual ones of the LEDs are individually controlled to selectively emit light beams, and each light beam forms a respective pixel or a portion of a respective pixel of the image content.

18. The method as recited in claim 17, wherein the room information includes one or more of depth information for surfaces in the room, lighting information for the room, specular information for surfaces or objects in the room, location and identification information for objects in the room, and location, motion, and orientation information for persons in the room.

19. The method as recited in claim 17, wherein the two or more projection units each comprise:
an LED array comprising a plurality of individually addressable LEDs;
light collection or light shaping optical elements, including a light pipe array comprising a plurality of light pipes; and
a condenser lens.

20. The method as recited in claim 19, wherein directing the two or more projection units of the spatial light system according to the image content and the room information to project the image content into at least a portion of the room comprises:
directing the LEDs in the two or more projection units to selectively emit light beams into the light pipes;
guiding, by the light pipes, the light beams emitted by the LEDs and emitting the guided light beams towards the condenser lenses; and
affecting, by the condenser lenses, the emitted light beams received from the light pipes and projecting the light beams onto one or more surfaces in a room;
wherein each light beam forms the respective pixel or the portion of the respective pixel of the image content on a surface within the room.

* * * * *